US008014879B2

(12) United States Patent
Latham et al.

(10) Patent No.: US 8,014,879 B2
(45) Date of Patent: Sep. 6, 2011

(54) METHODS AND SYSTEMS FOR ADAPTIVE CONTROL

(75) Inventors: Paul Latham, Lee, NH (US); John C. Canfield, Newmarket, NH (US)

(73) Assignee: L&L Engineering, LLC, Lee, NH (US)

( * ) Notice: Subject to any disclaimer, the term of this patent is extended or adjusted under 35 U.S.C. 154(b) by 853 days.

(21) Appl. No.: 11/553,917

(22) Filed: Oct. 27, 2006

(65) Prior Publication Data
US 2007/0112443 A1    May 17, 2007

Related U.S. Application Data

(60) Provisional application No. 60/735,384, filed on Nov. 11, 2005.

(51) Int. Cl.
G05B 21/02    (2006.01)
G05F 1/00    (2006.01)
H04B 3/20    (2006.01)
H03M 3/00    (2006.01)

(52) U.S. Cl. ............... 700/1; 700/73; 700/74; 323/283; 370/290; 341/143

(58) Field of Classification Search .................. 330/10, 330/101, 251
See application file for complete search history.

(56) References Cited

U.S. PATENT DOCUMENTS

| 5,051,981 | A | * | 9/1991 | Kline | 370/290 |
| 5,349,523 | A | * | 9/1994 | Inou et al. | 363/97 |
| 5,392,042 | A | * | 2/1995 | Pellon | 341/143 |
| 5,475,628 | A | | 12/1995 | Adams et al. | 364/724.1 |
| 5,510,698 | A | * | 4/1996 | Stankovic et al. | 323/282 |
| 5,901,176 | A | * | 5/1999 | Lewison | 375/238 |
| 6,104,968 | A | * | 8/2000 | Ananth | 700/297 |
| 6,271,781 | B1 | * | 8/2001 | Pellon | 341/143 |
| 6,775,164 | B2 | * | 8/2004 | Wong et al. | 363/147 |
| 6,940,733 | B2 | | 9/2005 | Schie et al. | 363/21.12 |
| 6,954,054 | B2 | * | 10/2005 | Brown | 323/283 |
| 6,979,987 | B2 | | 12/2005 | Kernahan et al. | |

(Continued)

FOREIGN PATENT DOCUMENTS
WO    WO 2006/056918    6/2006

OTHER PUBLICATIONS

Brown, Christopher, ed. Tutorial on Filtering, Restoration, and State Estimation. The University of Rochester, Jun. 1995. Rochester, NY: University of Rochester Computer Science Department, 1995. 45 pages.

(Continued)

Primary Examiner — Ramesh B Patel
Assistant Examiner — Sunray R Chang

(57) ABSTRACT

A digital controller includes a sampling component that samples an output signal from a system and an input signal to the system at a first sampling rate, which is at least equal to a predetermined operating rate. An input parameter obtaining component obtains a plurality of input parameters from the samples at the first sampling rate. A decimator component generates subsampled values for the plurality of input parameters at a second sampling rate, which is slower than the first sampling rate. An adaptive plant estimator component generates a model of the system based on the subsampled values. A compensator design component determines compensator parameters based on the model. The compensator parameters reflect changes in the system and are sampled at the second sampling rate. A feedback compensator adjusts the input signal to the system based on the compensator parameters.

20 Claims, 21 Drawing Sheets

U.S. PATENT DOCUMENTS

| | | | |
|---|---|---|---|
| 7,023,267 B2 * | 4/2006 | Lee et al. | 330/10 |
| 7,038,438 B2 * | 5/2006 | Dwarakanath et al. | 323/283 |
| 7,437,201 B2 * | 10/2008 | Cullen | 700/29 |
| 2003/0174005 A1 * | 9/2003 | Latham et al. | 327/172 |
| 2005/0231871 A1 | 10/2005 | Karimi Ghartemani | 361/86 |
| 2007/0112443 A1 * | 5/2007 | Latham et al. | 700/29 |
| 2007/0182610 A1 | 8/2007 | Latham et al. | 341/143 |

OTHER PUBLICATIONS

Maybck, Peter S. Stochastic Models Estimation and Control. vol. 1. New York: Academic Press, 1979. 19 Pages.

U.S. Appl. No. 60/735,384, filed Nov. 11, 2005 entitled Adaptive Linear Controller for DC-To-DC Converters.

Kelly, A. et al. Control of dc-dc converters by direct pole placement and adaptive feedforward gain adjustment. Applied Power Electronics Conference and Exposition, 2005. Twentieth Annual IEEE, vol. 3, Mar. 6-10, 2005, pp. 1970-1975.

Kelly, A. et al. High Resolution DPWM in a DC-DC Converter Application Using Digital Sigma-Delta Techniques. Power Electronics Specialists, 2005 IEEE 36th Conference on, Sep. 11-14, 2005, pp. 1458-1463.

Haykin, S. Introduction to Adaptive Filters, ISBN 0-02-949460-5, pp. 41-89, pp. 108-110, and pp. 139-143, 1984.

International Search Report dtd. Mar. 28, 2008 for PCT/US06/60803 filed Nov. 10, 2006. Applicants: L&L Engineering LLC.

* cited by examiner

METHODS AND SYSTEMS FOR ADAPTIVE CONTROL

CROSS REFERENCE TO RELATED APPLICATIONS

This application claims priority of U.S. Provisional Application 60/735,384 entitled "Adaptive Linear Controller for DC-to-DC Converters," filed on Nov. 11, 2005, which is incorporated by reference herein.

BACKGROUND

Applying digital methods to the control of systems bears the promise of creating new features, improving performance, providing greater product flexibility, and providing a lower cost. System operating characteristics dictated by a stored program, rather than the parameters of a set of discrete components, can result in cost and space savings as well as capacity for real time adaptation of those characteristics, greater sophistication in control algorithms and the ability to generate, store and recall valuable real-time functional data.

However, digital feedback control requires high resolution and high speed. These requirements have limited the adoption of digital control in many fields. The advent of low cost logic has it made possible the application of digital control techniques to cost sensitive fields. As the cost of digital logic decreases, new opportunities arise.

A typical digitally controlled feedback system has an analog to digital converter, digital loop compensator, power device driver, and an external system to be controlled. An example of a system in which application of digital control can improve performance or lower cost is the switching power supply or DC-to-DC converter. (However, many other systems would also benefit from application of digital control.)

It is very desirable to minimize the cost, size and power dissipation of a low-cost off-line switching power supply for low power applications, such as recharging cells and batteries used in portable consumer appliances, such as entertainment units, personal digital assistants, and cell phones, for example.

A PWM switched power supply requires a variable pulse width that is controlled by an error signal derived by comparing actual output voltage to a precise reference voltage. The pulse width of the switching interval must also be constrained to be within a minimum and maximum duration. These constraints are imposed for correct PWM power supply or motor driver operation.

An example of a digitally controlled system is shown in FIG. 1. In the example shown in FIG. 1, the system is a simple buck Switching power supply, The fundamental components are the same for any Switching power supply. The sample system shown in FIG. 1 includes three major components: a compensator preceded by an ADC, PWM and power switches, and passive LC network.

Most power management design is based on simple, continuous compensation using frequency domain analysis. Bode analysis is frequently used as the design technique of choice.

More modern techniques such as modeling of the converter in discrete time and using pole placement or optimization techniques to set the gains are not usually considered. Recently developed digital power management chips use the digital equivalent of analog continuous time designs. The design procedure starts with an analog prototype which is discretized and implemented in hardware.

BRIEF SUMMARY

In one embodiment, the system of these teachings includes a Switching power supply, an adaptive plant estimation component capable of receiving an output voltage from the Switching power supply and an input to the Switching power supply and of providing a model of the Switching power supply; the model reflecting changes in output voltage state of the Switching power supply, a compensator design component capable of receiving the model of the Switching power supply and of providing compensator parameters, the compensator parameters reflecting changes in output voltage state of the Switching power supply, an adaptive compensator capable of receiving the compensator parameters and of providing the input control signal to the driver component.

In another embodiment, the controller of these teachings includes a sampling component capable of sampling an output signal from a system and an input signals from the system at a first sampling rate, the first sampling rate being at least equal to a predetermined operating rate, an input parameter obtaining component capable of receiving the output signal and the input signal sampled at the first sampling rate and of obtaining values for a plurality of input parameters, the values for the input parameters being sampled at the first sampling rate, a decimator component capable of receiving the values for the input parameters sampled at the first sampling rate and of providing subsampled values for the input parameters, subsampled values being sampled at a second sampling rate, the second sampling rate been slower than the first sampling rate, an adaptive plant estimator component capable of receiving the subsampled values of the input parameters and of obtaining a model of the system, the model reflecting variations in the system and a compensator design component capable of receiving the model of the system and of providing compensator parameters the compensator parameters reflecting changes in the system, values of said compensator parameters being sampled at the second sampling rate, the compensator design component being capable of providing the values of the compensator parameter to a compensator.

Various other embodiments of the system of the controller of these teachings are also disclosed. Various embodiments of the method of these teachings are also disclosed.

For a better understanding of these teachings, together with other and further needs thereof, reference is made to the accompanying drawings and detailed description and its scope will be pointed out in the appended claims.

DETAILED DESCRIPTION

In one embodiment, the system of these teachings includes a Switching power supply, an adaptive plant estimation component capable of receiving an output voltage from the Switching power supply and an input to the Switching power supply and of providing a model of the Switching power supply, the model reflecting changes in output voltage state of the Switching power supply, a compensator design component capable of receiving the model of the Switching power supply and of providing compensator parameters, the compensator parameters reflecting changes in output voltage state of the Switching power supply, an adaptive compensator capable of receiving the compensator parameters and of providing the input control signal to the driver component. The Switching power supply includes a circuit having at least two reactive components configured to provide an output voltage and capable of being switched from one output voltage state to another output voltage state, a switching component capable of switching said circuit between one output voltage state and the other output voltage state, and a driver component capable of receiving an input control signal and of diving the switching component in order to cause switching between the one output voltage state and the other output voltage state in response to the input control signal.

Figure 1:
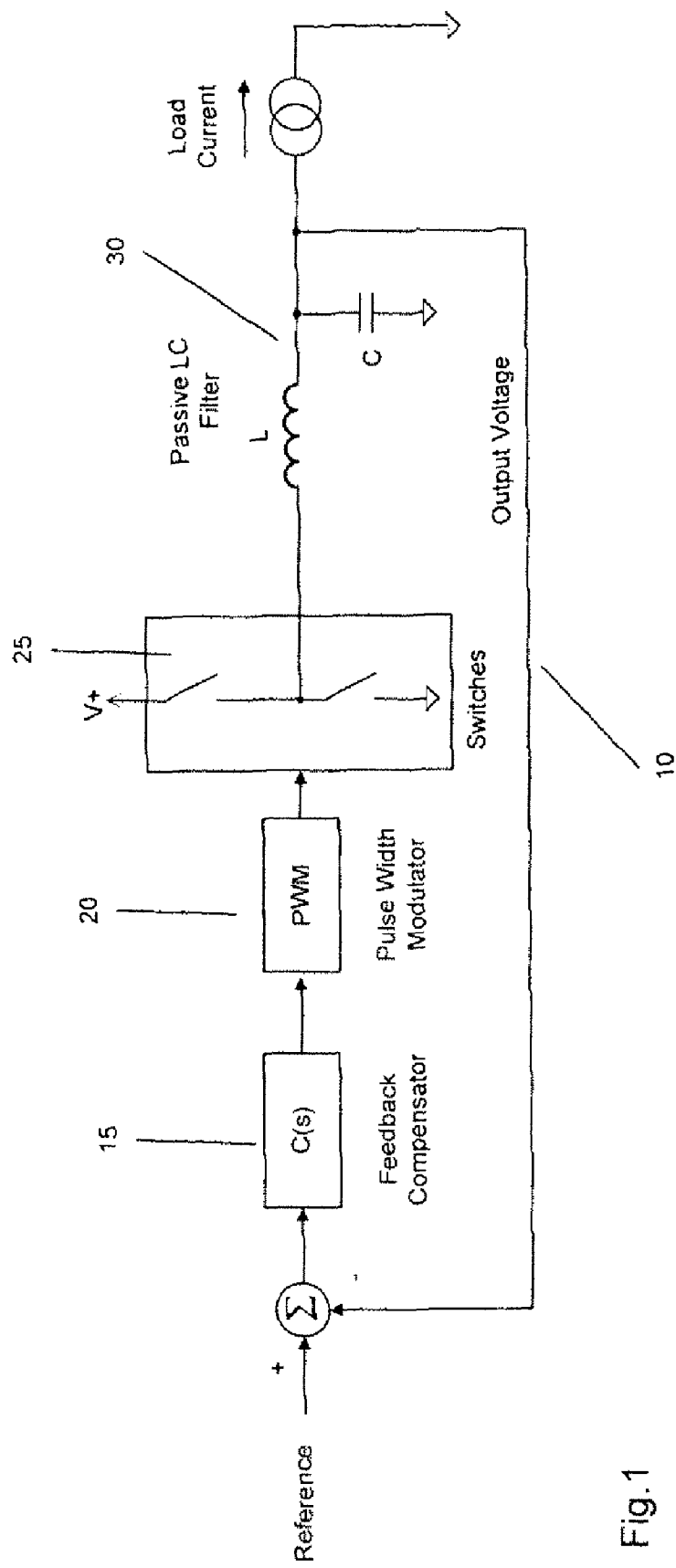
FIG. 1 is a graphical schematic presentation of a conventional system.
Figure 2:
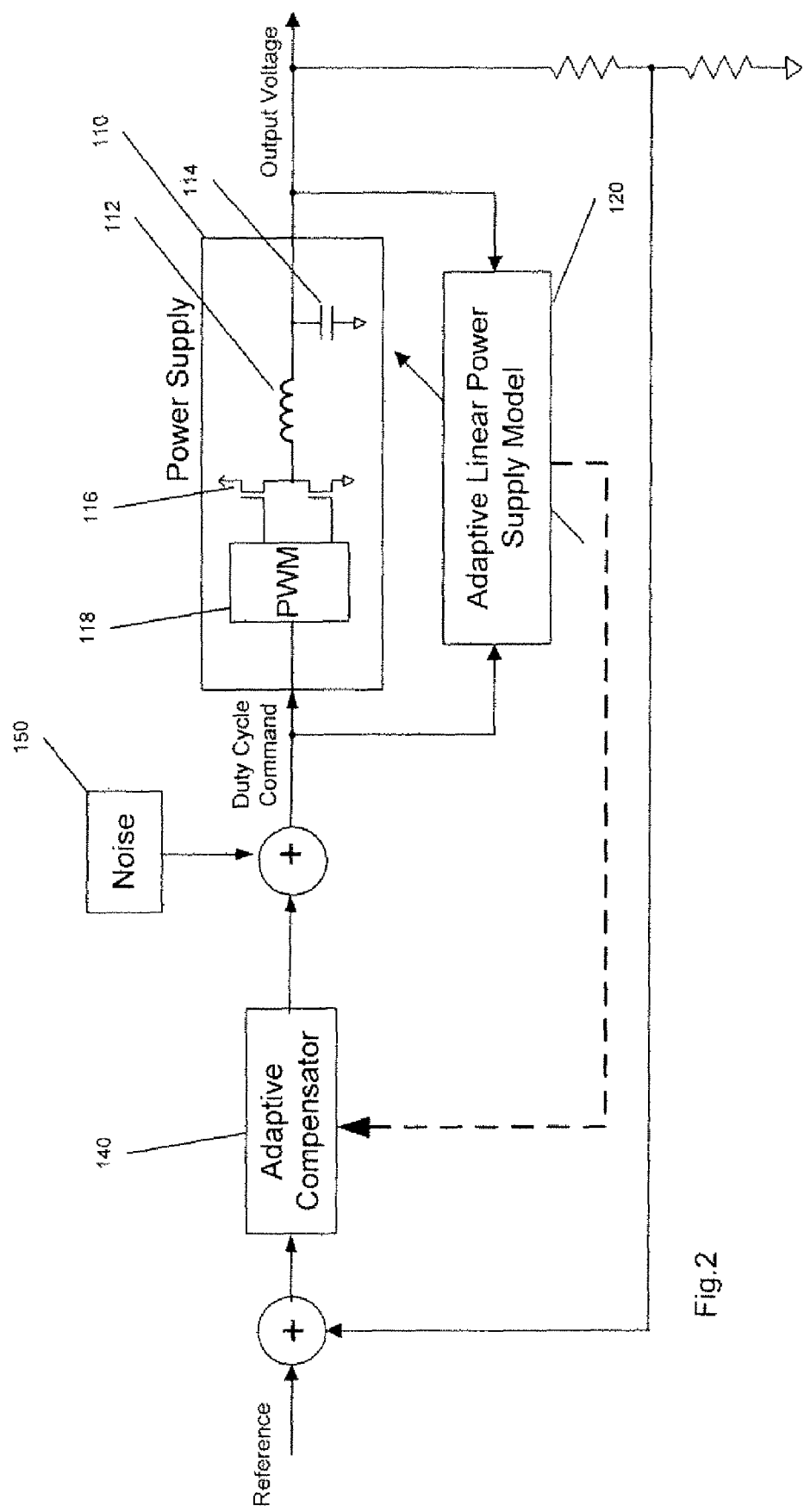
FIG. 2 is a graphical schematic presentation of an embodiment of the system of these teachings.

FIG. 2 presents a block diagram of an embodiment of the system of these teachings. Referring to FIG. 2, a Switching power supply 110 includes an inductor 112 and a capacitor 114 and a switching component 116 and a driver component 118 (a PWM). The voltage across the capacitor 114 is the output voltage of the Switching power supply 110. An adaptive plant estimation component 120 receives the output voltage 124 of the Switching power supply 10 and the input control signal 126 to the Switching power supply 110 and provides a model of the Switching power supply 110, where the model reflects changes in the Switching power supply 110. The model to Switching power supply 110 is provided to a compensator design component 130, which provides compensator component parameters to the adaptive compensator 140. The compensator design parameters reflect changes in the compensation needed to account for changes in the Switching power supply 110. In some embodiments, a disturbance injection component 150 provides a substantially small noise signal that can aid in the detection of changes in the Switching power supply 110. In some embodiments, the adaptive plant estimator component 120 utilizes the LMS algorithm in order to provide a model of the Switching power supply 110. (For a description of the LMS algorithm, see, for example, S. Haykin, Introduction to Adaptive filters, ISBN 0-02-949460-5, pp. 108-110, which is incorporated by reference herein.). In other embodiments, the adaptive plant estimator component 120 utilizes and RLS algorithm (for a description of the RLS algorithm, see, for example, S. Haykin, Introduction to Adaptive Filters, ISBN 0-02-949460-5, pp. 139-143, which is incorporated by reference herein).

It should be noted that while the exemplary Switching power supply embodiment of these teachings is described by one exemplary type, other power supply architectures such as boost, buck-boost, flyback, forward, etc are within the scope of these teachings.

In one embodiment, the controller of these teachings includes a sampling component capable of sampling an output signal from a system and an input signals from the system at a first sampling rate, the first sampling rate being at least equal to a predetermined operating rate, an input parameter obtaining component capable of receiving the output signal and the input signal sampled at the first sampling rate and of obtaining values for a plurality of input parameters, the values for the input parameters being sampled at the first sampling rate, a decimator component capable of receiving the values for the input parameters sampled at the first sampling rate and of providing subsampled values for the input parameters, subsampled values being sampled at a second sampling rate, the second sampling rate been slower than the first sampling rate, an adaptive plant estimator component capable of receiving the subsampled values of the input parameters and of obtaining a model of the system, the model reflecting variations in the system.

Although the embodiments described hereinbelow are described in terms of a particular controlled component, it should be noted that the embodiments described hereinbelow can be applied to a wide range of other controlled components.

Figure 3:
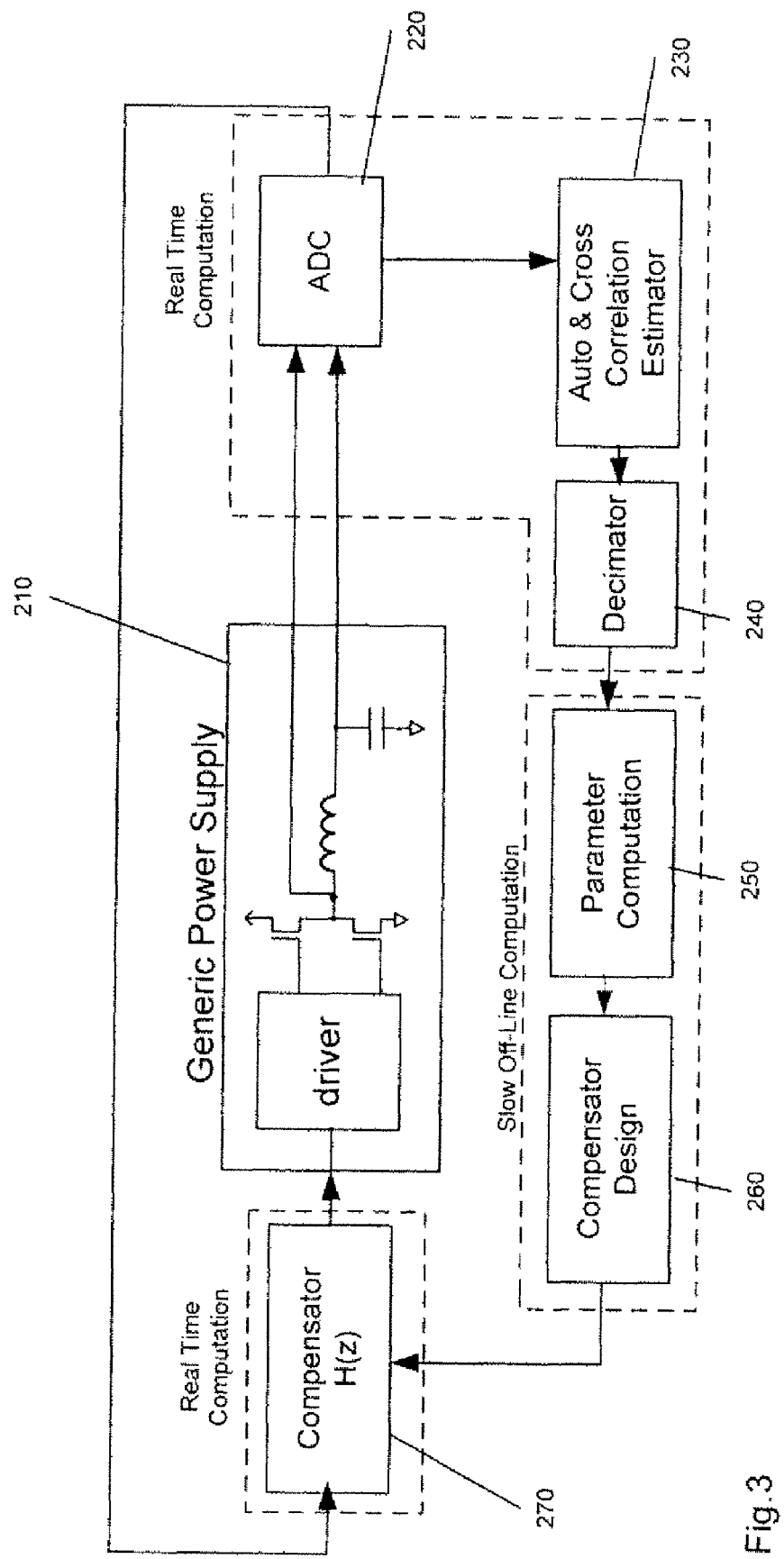
FIG. 3 is a graphical schematic representation of another embodiment of the system of these teachings.

FIG. 3 shows a block diagram representation of an embodiment of the controller of these teachings. Referring to FIG. 3, the embodiment shown therein includes a sampling component 220 that samples an output signal from a system 210 and an input signal from the system at a first sampling rate, the first sampling rate being greater than or equal to a predetermined operating rate, an input parameter obtaining component 230 capable of receiving the output signal and the input signal sampled at the first sampling rate and of obtaining values for a number of input parameters, the values for the input parameters being sampled at the first sampling rate, a decimator component 240 capable of receiving the values for the input parameters sampled at the first sampling rate and of providing subsampled values for the input parameters, the subsampled values being sampled at a second sampling rate, the second sampling rate been slower than the first sampling rate, an adaptive plant estimator component 250 that receives the subsampled values of the input parameters and obtains a model of the system 210, the model reflecting variations in the system and a compensator design component 260 that receives the model of the system and of providing compensator parameters, the compensator parameters reflecting changes in the system values of said compensator parameters being sampled at the second sampling rate; said compensator design component being capable of providing said values of said compensator parameter to a compensator 270. The compensator 270 operates at the predetermined operating rate.

In one exemplary embodiment, these teachings not being limited to that exemplary embodiment, parameters of the system 210 (DC-to-DC power supply) vary slowly. Therefore it is possible to make the parameter updates a slower, offline computation. In a linear compensator type design, an analog-to-digital converter 220 (ADC) measures the output and input (and intermediate in some embodiments) voltages in the power supply 210 and provides them to the compensator 270. This allows for both error feedback and correction of input supply variations. The ADC results are also used by the auto- and cross-correlators 230 to measure the behavior of the power supply 210, The resulting correlation coefficients are used to design the compensator. The parameter computation and compensator design are done offline at a lower sampling rate. This lowers the cost of those tasks, because the digital logic can be in the form of a simple micro-sequencer. If it is desired, the compensator can also be implemented in analog form, with digital adjustments made during the compensator design stage.

Figure 4:
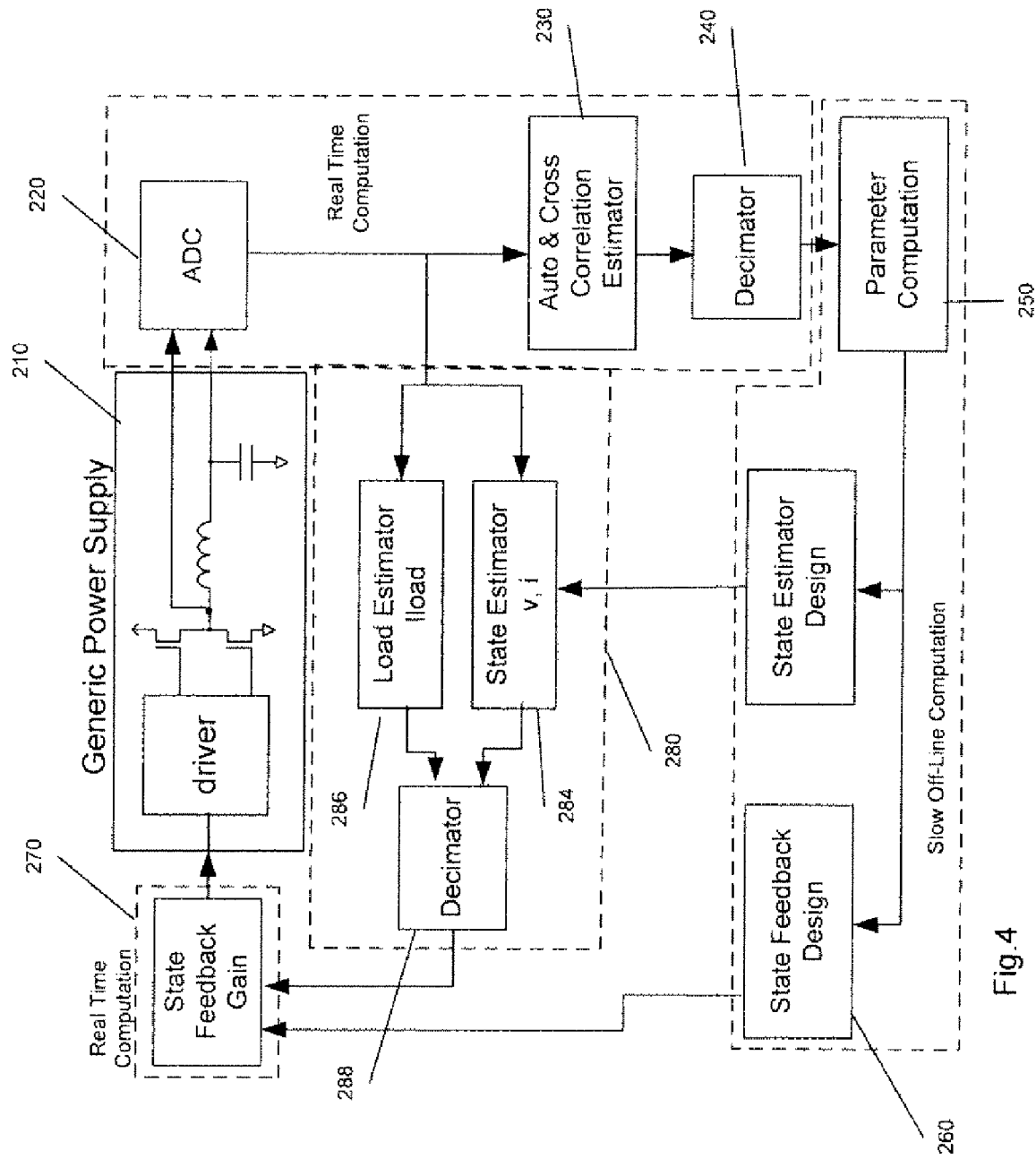
FIG. 4 shows a graphical schematic representation of a further embodiment of the system of these teachings.

In another embodiment, shown in FIG. 4, the controller of these teachings also includes a load current estimating component 280 capable of receiving the output signal sampled at the first sampling rate and state estimation data from the adaptive plant estimator component 250 and of providing estimated load current data at the first sampling rate and another decimator component 288 capable of receiving the estimated load current data at the first sampling rate and of providing estimated load current data at the predetermined operating rate to the compensator 270.

In one instance, the ADC provides inputs to a state estimator 284. The estimated states are then used by the feedback gain matrix in the compensator 270 to complete the feedback system. In another instance, a load current estimator is also included. The load current estimator 286 allows for the effect of variations in the load current to be minimized. The values from the load current estimator 286 and the state estimator 284 are provided to another decimator 288 that provides estimated load current data at the predetermined operating rate to the compensator 270.

Figure 5:
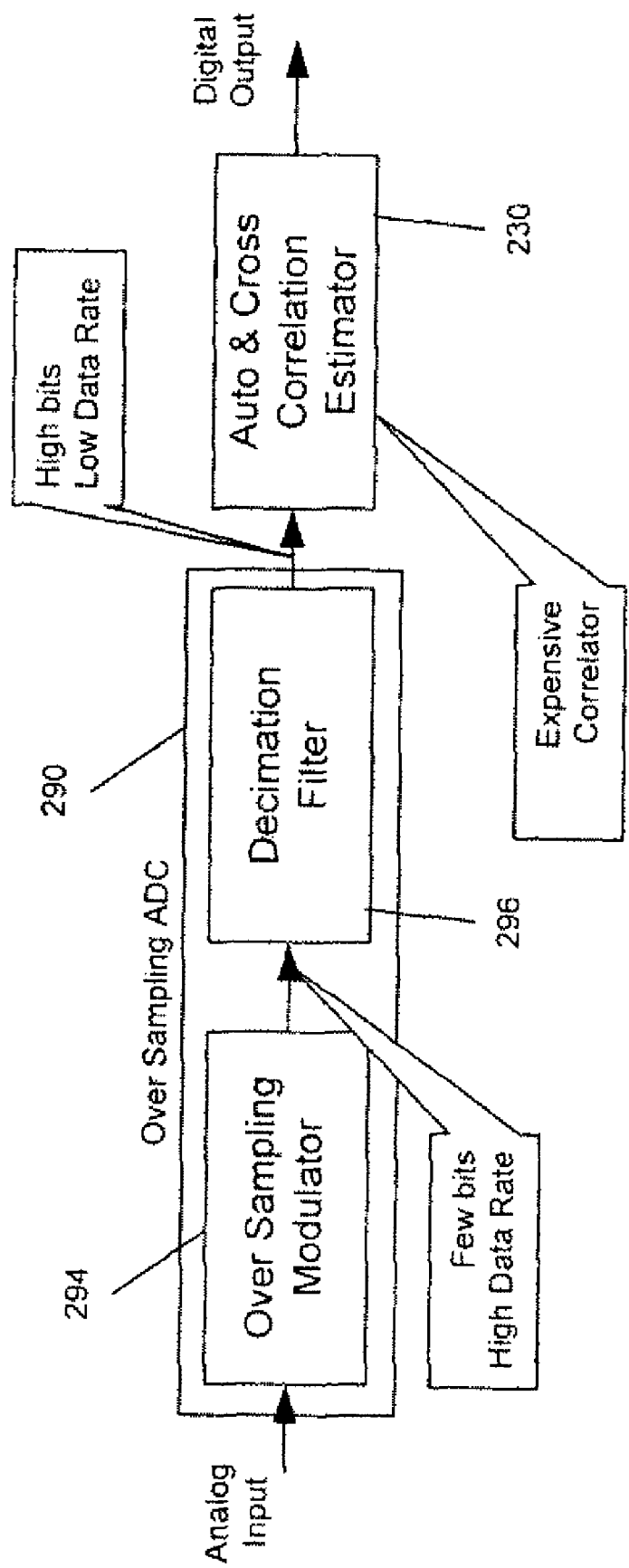
FIG. 5 shows a graphical schematic representation of a component of an embodiment of the system of these teachings.

In one instance, as shown in FIG. 5, the ADC is an oversampling ADC, aDelta Sigma ADC 290 in the embodiment shown, including a an oversampling modulator, delta-sigma modulator 294 in the embodiment shown, and a decimation filter 296. The oversampling modulator 290 converts the analog input voltage into a high-speed, digital bit stream. The digital bit stream may be as little as one bit wide. Because the digital bit stream is sampled at a very high rate, it is possible to low-pass filter the bit stream and to recover a high-precision, lower-sample-rate representation of the analog signal.

Figure 6:
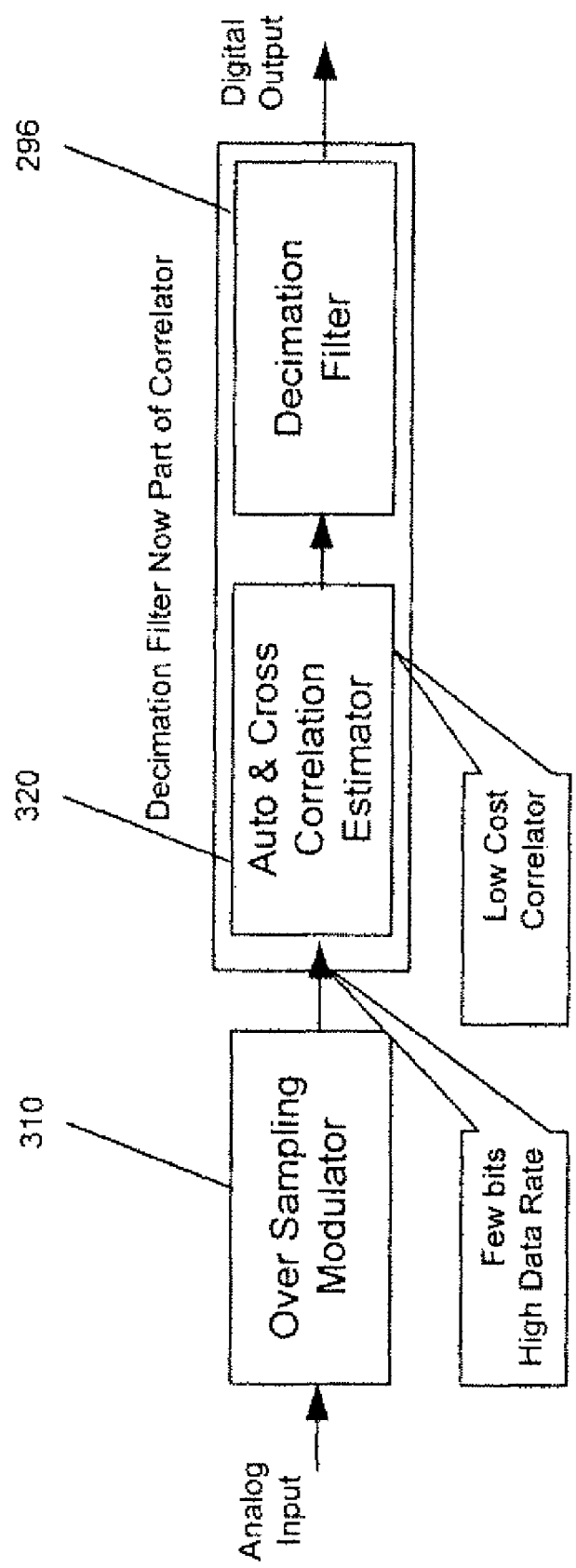
FIG. 6 depicts a graphical representation of another embodiment of the component of an embodiment of the system of these teachings.

In one embodiment, shown in FIG. 6, the sampling component (220, FIG. 3) is a oversampling (sigma delta in one embodiment) modulator 310 and the first sampling rate is an oversampled rate. In the embodiment shown in FIG. 6, the input parameter obtaining component (230, FIG. 3) is an autocorrelation and crosscorrelation estimator 320. It should be noted that other embodiments of the input parameter obtaining component are possible and within the scope of these teachings. It should also be noted that embodiments are possible in which the oversampling (sigma delta in one embodiment) modulator 310 provides inputs to the state estimator 284 and the load estimator 286.

In many applications, including the DC-to-DC converter application, and in particular for embodiment utilizing the cross- and autocorrelation functions, the decimation filter (decimator) function 240 can be built-in. This reduces the cost because a one-bit multiplier is just a single gate, while a high-precision digital multiplier can be a costly design.

Figure 7:
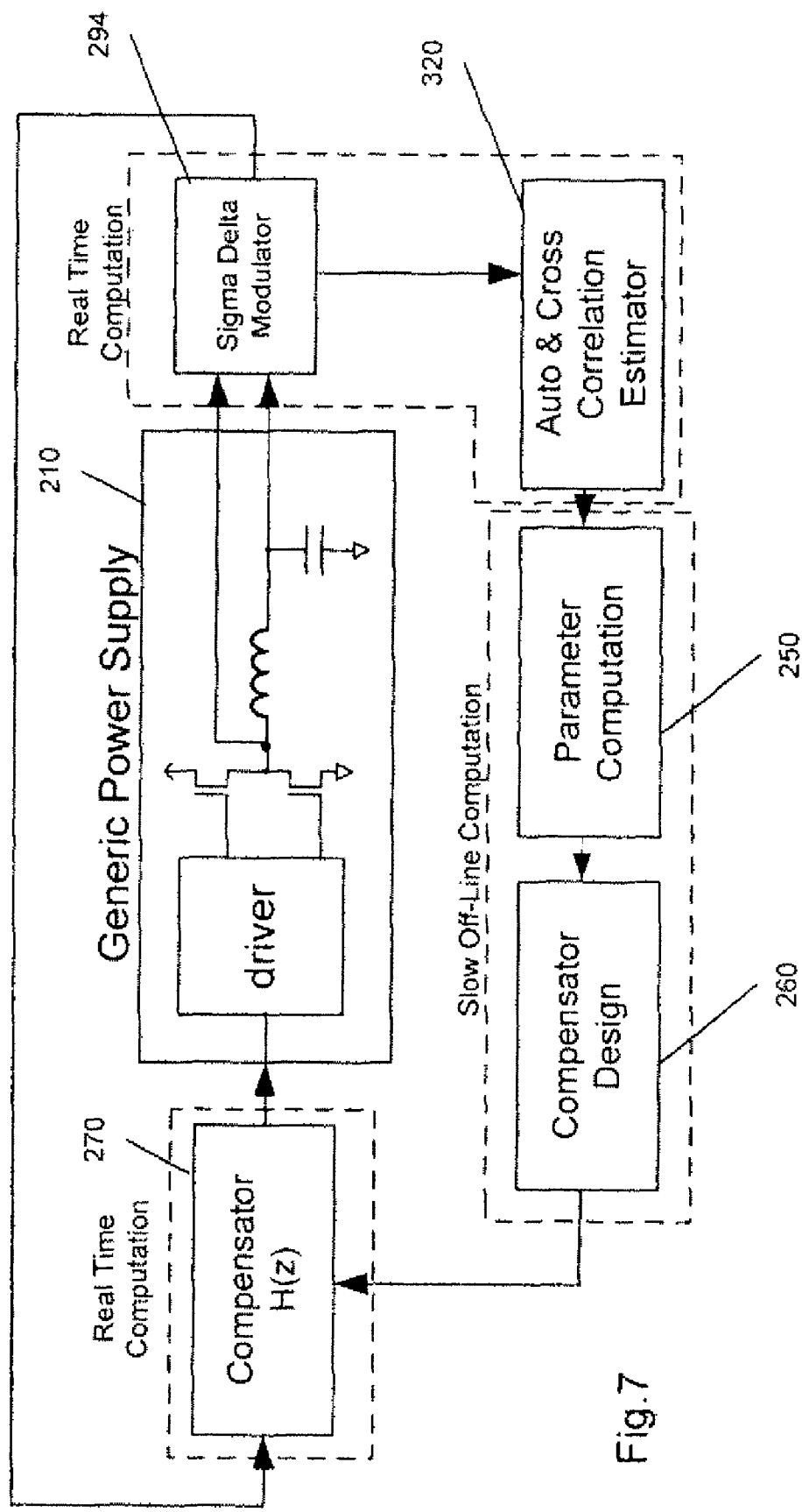
FIG. 7 is a graphical schematic representation of yet another embodiment of a system of these teachings.

FIG. 7 shows an embodiment of the system of these teachings in which the oversampling (sigma delta in one embodiment) modulator 310 is used as a sampling component. In the embodiment shown in FIG. 7, the system is a switching power supply or a generic power supply. The driver component in the switching power supply is typically a PWM (pulse width modulator) Of specific interest in many instances, especially, but not limited to, the instance in which the driver component is a PWM, it is the specific embodiment in which the first sampling rate (or the oversampled rate in one instance) is substantially equal to twice the operating rate of the system (the PWM rate in embodiments in which the driver is a PWM). In the embodiment shown in FIG. 7, the decimator is integral to the autocorrelation and crosscorrelation estimator 320.

Figure 8:
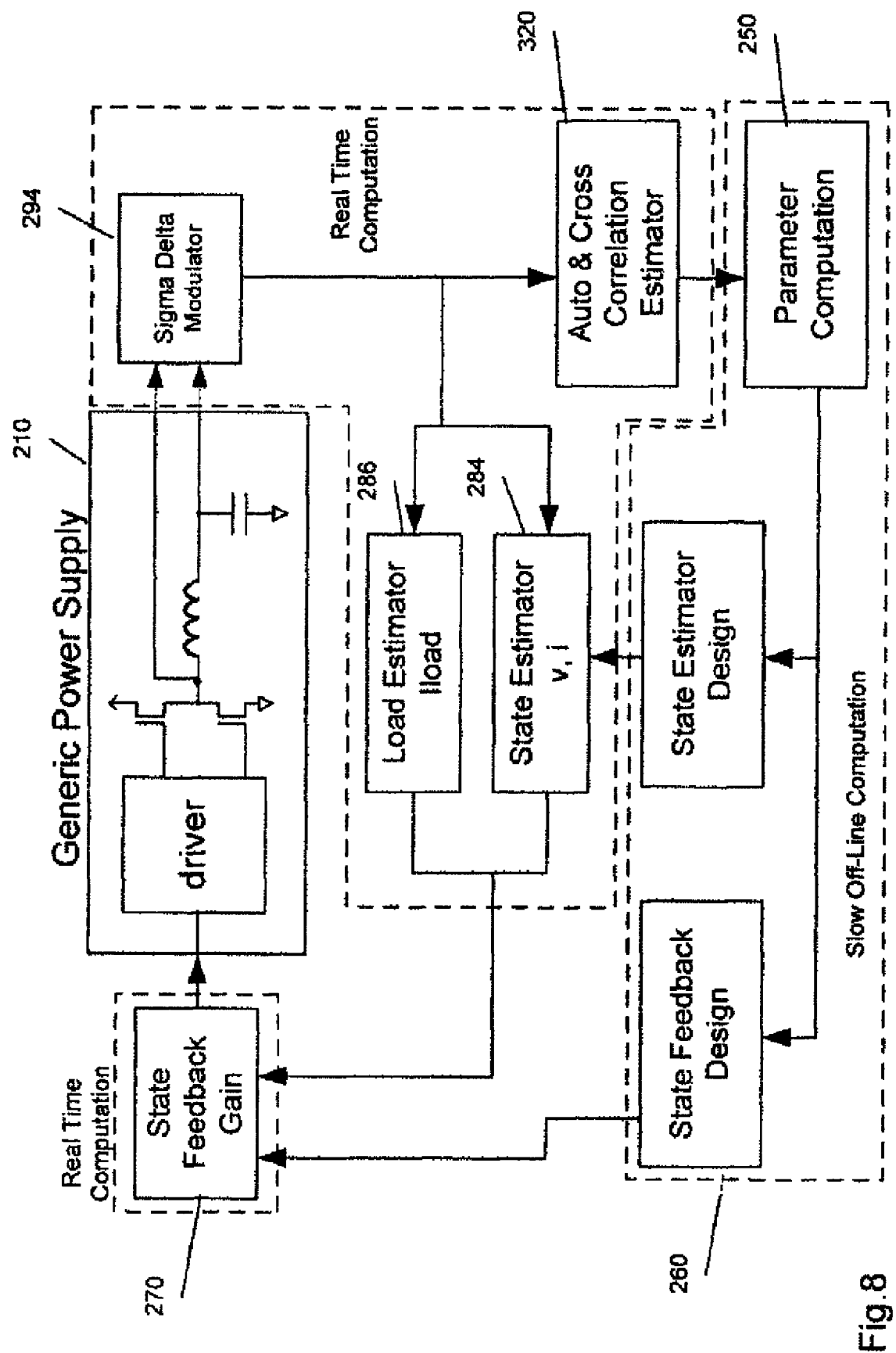
FIG. 8 depicts a graphical schematic representation of still a further embodiment of the system of these teachings.

FIG. 8 shows an embodiment of the system of these teachings in which the oversampling (sigma delta in one embodiment) modulator 310 is used as a sampling component and load current and state estimation method is also performed. In the embodiment shown in FIG. 8, the decimator is integral to the autocorrelation and crosscorrelation estimator 320 and the other decimator (288, FIG. 4) is also built-in. The use of a high-speed bit stream for digital converter control applies not just to correlators but also to compensators as well, in particular, even a simple proportional-integral-derivative (PID) compensator, when implemented in the velocity form. In this compensator, the error signal is processed by the sum of a gain, a gain times the derivative, and a gain times the second derivative. The processing result is then integrated. The decimation function, in this embodiment, is achieved by the final integrator and the dynamics of the power supply itself.

In one embodiment, the method of these teachings includes sampling an output signal from a system and an input signal from the system at a first sampling rate, the first sampling rate being at least equal to a predetermined operating rate, obtaining, from the sampled output signal and the sampled input signal, values for a number of input parameters, the values for the input parameters being sampled at the first sampling rate, decimating the values for the input parameter in order to obtain values for a number of subsampled input parameters, the subsampled input parameters being sampled at a second sampling rate, the second sampling rate been slower than the first sampling rate, obtaining, from the subsampled input parameters, a model for the system, obtaining, from the model for the system, compensator parameters and providing the compensator parameters to an adaptive compensator.

In one instance of the above described embodiment of the method of the present teachings, the input parameters for generating a model of the system are the autocorrelation and crosscorrelation. In one instance, simplified hardware can be used to calculate the auto- and cross-correlation. In many instances, the compensator does not have to be updated at every cycle thus the calculations of the planned estimate can be done at a much lower sampling rate. This allows the high-speed part of the algorithm to be implemented in specialized hardware and the low-speed part of the algorithm to be implemented in a very low-cost general purpose microprocessor.

In one instance, the high-speed algorithm may use a delta-sigma modulator as the ADC conversion element, as disclosed hereinabove This high-speed, small-bit-width, oversampled data conversion method allows for simpler hardware. The typical delta-sigma ADC decimator can be integrated into or replaced by the correlation filter. Thus the correlation filter hardware is simplified.

A number of conventional techniques (algorithms) can be utilized for the adaptive identification of unknown dynamic systems, One of these conventional techniques is the least mean squares (LMS) algorithm. This technique can be easily implemented. However, the LMS algorithm can be slow to converge. The LMS algorithm is effective for the power supply converter application because good initial guesses can be given, so the power supply behaves properly before any adaptation is achieved. In many applications, it is desirable to use an algorithm that can identify the dynamics of the power supply in a time short compared to the time over which the system changes. For example, it is desirable for the algorithm to determine the dynamics of the object being controlled, in this case, the power electronics associated with the power supply, during startup and before regulation began.

One conventional technique for fast plant identification is the Recursive Least Squares (RLS) algorithm. This technique provides for fast convergence, however, it can suffer from a high computational burden. Also, the normal formulation of the Recursive Least Squares algorithm also has some assumptions in it that limit very high-speed performance.

The foundation of the use of autocorrelation and crosscorrelation for system identification comes from the statistical solution which minimizes the mean square error of the Wiener filter is given in equation (1) where $\hat{w}$ is the vector of estimated filter coefficients, $R_{xx}$ is the correlation matrix of the input signal, ad $r_{xy}$ is the cross-correlation vector of the input and output signals.

$$\hat{w} = R_{xx}^{-1} r_{xy} \quad (1)$$

It is possible to numerically estimate the auto-correlation matrix and cross-correlation vector from the observed input and output signals of the plant (system) being identified. These estimates may be used directly to compute the estimated weight vector. In one embodiment of the method of the present teachings, the computational load is separated into two segments, one which must be performed on every new data sample and one which must be performed only when it is desired to update the weight estimates. By scheduling the weight updates at a slower rate than the data, the overall computational burden of the algorithm can be reduced. However, when computed, the weight estimates will still make use of all data to that point. Thus, this method sacrifices only the weight update rate and not the quality of the estimates. Equation (2) depicts numerical estimates of the auto-correlation matrix and cross-correlation vector. The individual terms can then be computed using equations (3) and (4). Additionally, these expressions can be rewritten in a recursive manner such that they are updated incrementally with each new data point as given by (5) and (6), where the second index is the discrete time offset.

$$\hat{R}_{xx} = \begin{bmatrix} \hat{r}_{xx}[0] & \hat{r}_{xx}[1] & \cdots & \hat{r}_{xx}[P-1] \\ \hat{r}_{xx}[1] & \hat{r}_{xx}[0] & & \hat{r}_{xx}[P-2] \\ \vdots & & \ddots & \\ \hat{r}_{xx}[P-1] & \hat{r}_{xx}[P-2] & & \hat{r}_{xx}[0] \end{bmatrix}, \quad (2)$$

$$\hat{r}_{xy} = \begin{bmatrix} \hat{r}_{xy}[0] \\ \hat{r}_{xy}[1] \\ \vdots \\ \hat{r}_{xy}[P-1] \end{bmatrix}$$

$$\hat{r}_{xy}[j] = \frac{1}{N} \sum_{m=0}^{N-1} y[m]x[m-j] \quad (3)$$

$$\hat{r}_{xx}[j] = \frac{1}{N} \sum_{m=0}^{N-1} x[m]x[m-j] \quad (4)$$

$$\hat{r}_{xy}[j, k+1] = \frac{k+1}{k+2} \hat{r}_{xy}[j, k] + \frac{1}{k+1} y[k]x[k-j] \quad (5)$$

$$\hat{r}_{xx}[j, k+1] = \frac{k+1}{k+2} \hat{r}_{xx}[j, k] + \frac{1}{k+1} x[k]x[k-j] \quad (6)$$

The optimal weight vector based on the numerical estimates can then be expressed as given in equation (7). Since the auto-correlation matrix has a Toeplitz structure, there are only 2P recursive estimates necessary for computation of the entire expression. Additionally, this structure allows for the use of efficient matrix inversion techniques which utilize this symmetry to reduce the number of required computations.

$$\hat{w} = \begin{bmatrix} \sum_{m=0}^{N-1} x[m]x[m] & \sum_{m=0}^{N-1} x[m]x[m-1] & \sum_{m=0}^{N-1} x[m]x[m-2] \\ \sum_{m=0}^{N-1} x[m]x[m-1] & \sum_{m=0}^{N-1} x[m]x[m] & \sum_{m=0}^{N-1} x[m]x[m-1] \\ \sum_{m=0}^{N-1} x[m]x[m-2] & \sum_{m=0}^{N-1} x[m]x[m-1] & \sum_{m=0}^{N-1} x[m]x[m] \end{bmatrix}^{-1} \quad (7)$$

$$\begin{bmatrix} \sum_{m=0}^{N-1} y[m]x[m] \\ \sum_{m=0}^{N-1} y[m]x[m-1] \\ \sum_{m=0}^{N-1} y[m]x[m-2] \end{bmatrix}$$

In another embodiment, the method of these teachings includes sampling an output signal from a system and an input signal from the system, obtaining, from the sampled output signal and the sampled input signal, values for a predetermined finite number of rows and columns from an inverse matrix and a predetermined finite number for a row vector in a least-squares solution, and obtaining, from the values for the predetermined finite number of rows and columns from an inverse matrix and the predetermined finite number for a row vector in a least-squares solution, a model for the system. Once a model of the system is obtained, an adaptive control method can be Implemented.

While not desiring to be bound by theory, one rationale motivating the above described embodiment is given hereinbelow. The result of equation (7) above provides the same answer as the batch least squares solution in the case of infinite data. However, for any finite interval of data, the above result and the batch least squares result will differ. This can be seen directly by computing the batch mode least squares solution given by (8) over the same time interval [0,N−1], which results in the least squares weight vector given in equation (9). Comparison of the solutions in equation (7) and (9) indicate differences in the auto-correlation matrices. In fact, the least squares auto-correlation matrix of equation (9) is not necessarily Toeplitz for any finite data set. For a stationary input signal, and as the numerical sum approaches the true statistical value that the two solutions (Equations (7) and (9)) are identical. However, in many applications, it is desirable to have the best possible estimate given a short finite interval of data. The estimate given by (9) minimizes the sum squared error over any finite data set.

$$\hat{w} = [X^T X]^{-1} X^T y \qquad (8)$$

$$\hat{w} = \qquad (9)$$

$$\begin{bmatrix} \sum_{m=2}^{N-1} x[m]^2 & \sum_{m=2}^{N-1} x[m]x[m-1] & \sum_{m=2}^{N-1} x[m]x[m-2] \\ \sum_{m=2}^{N-1} x[m]x[m-1] & \sum_{m=2}^{N-1} x[m-1]^2 & \sum_{m=2}^{N-1} x[m-1]x[m-2] \\ \sum_{m=2}^{N-1} x[m]x[m-2] & \sum_{m=2}^{N-1} x[m-1]x[m-2] & \sum_{m=2}^{N-1} x[m-2]^2 \end{bmatrix}^{-1}$$

$$\begin{bmatrix} \sum_{m=2}^{N-1} y[m]x[m] \\ \sum_{m=2}^{N-1} y[m]x[m-1] \\ \sum_{m=2}^{N-1} y[m]x[m-2] \end{bmatrix}$$

The individual terms in equation (9) can, in one embodiment, be represented by iterative solutions and the computational load can be split as discussed above such that the weight vector solution is performed at a sub-sampled rate. However, there are now ½(P²+P) unique entries in the auto-correlation matrix, It is not necessary to compute each of these separately since elements along each diagonal are simply a delayed version of first element of the diagonal as given by equation (10).

$$a_{i,j}[k] = a_{i-1,i-1}[k-1] \qquad (10)$$

Given the above described property and the symmetry of the matrix only P running estimates need to be computed and the appropriate past values of each estimate must be stored. The auto-correlation matrix can then be computed directly from these values. Hereinbelow, this embodiment of the method of the present teachings is also referred as Iterative Least Squares since it exactly implements the least square solution over any finite interval of data.

The above described embodiment is generally applicable for both the FIR and IIR filters. In the instance where the above described embodiment is applied to IIR filters, the input matrix includes a mixture of both the past and current inputs as well as the past outputs.

It should be noted that the embodiments described hereinabove can be applied to a wide range of controlled components besides switching power supplies.

In order to better illustrate the systems and methods of the present teachings, results and details of several exemplary embodiments are presented hereinbelow. It should be noted that the methods and systems of these teachings are not limited to (or limited by) the illustrative embodiment presented hereinbelow.

In one illustrative embodiment, the Iterative Least Squares solution of equation (9) is compared with the method of equation (7) which uses the conventional numerical correlation estimates. In one instance, the two embodiments are simulated in a noise-free environment., The system to be identified is a 5 tap FIR filter with coefficients given in (9) and fed with a uniformly distributed random number sequence.

$$B = [1.0 \ 2.0 \ -0.5 \ -0.3 \ 1.2] \qquad (11)$$

Figure 9:
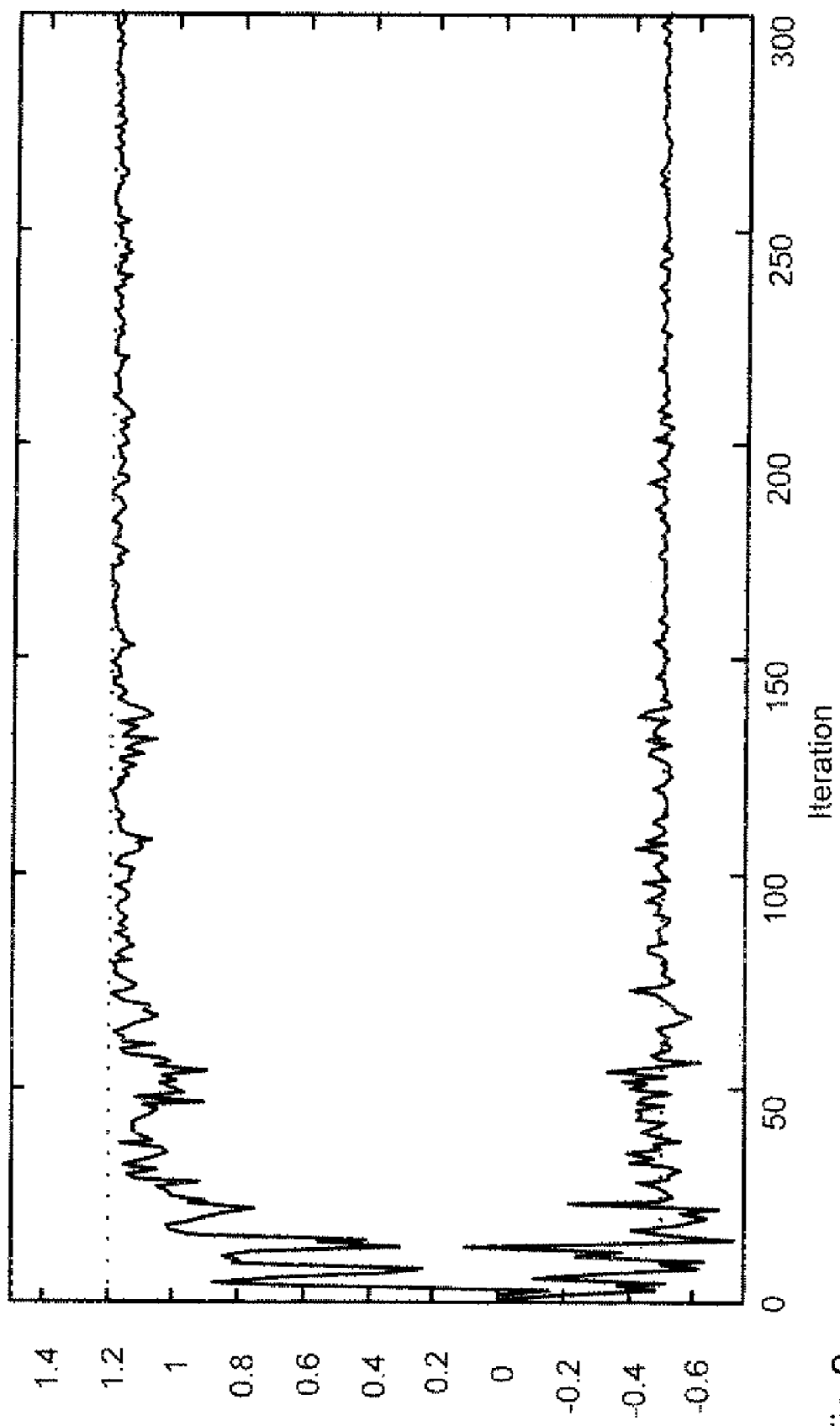
FIGS. 9-14 depict graphical representations of results from embodiments of the system of these teachings.
Figure 10:
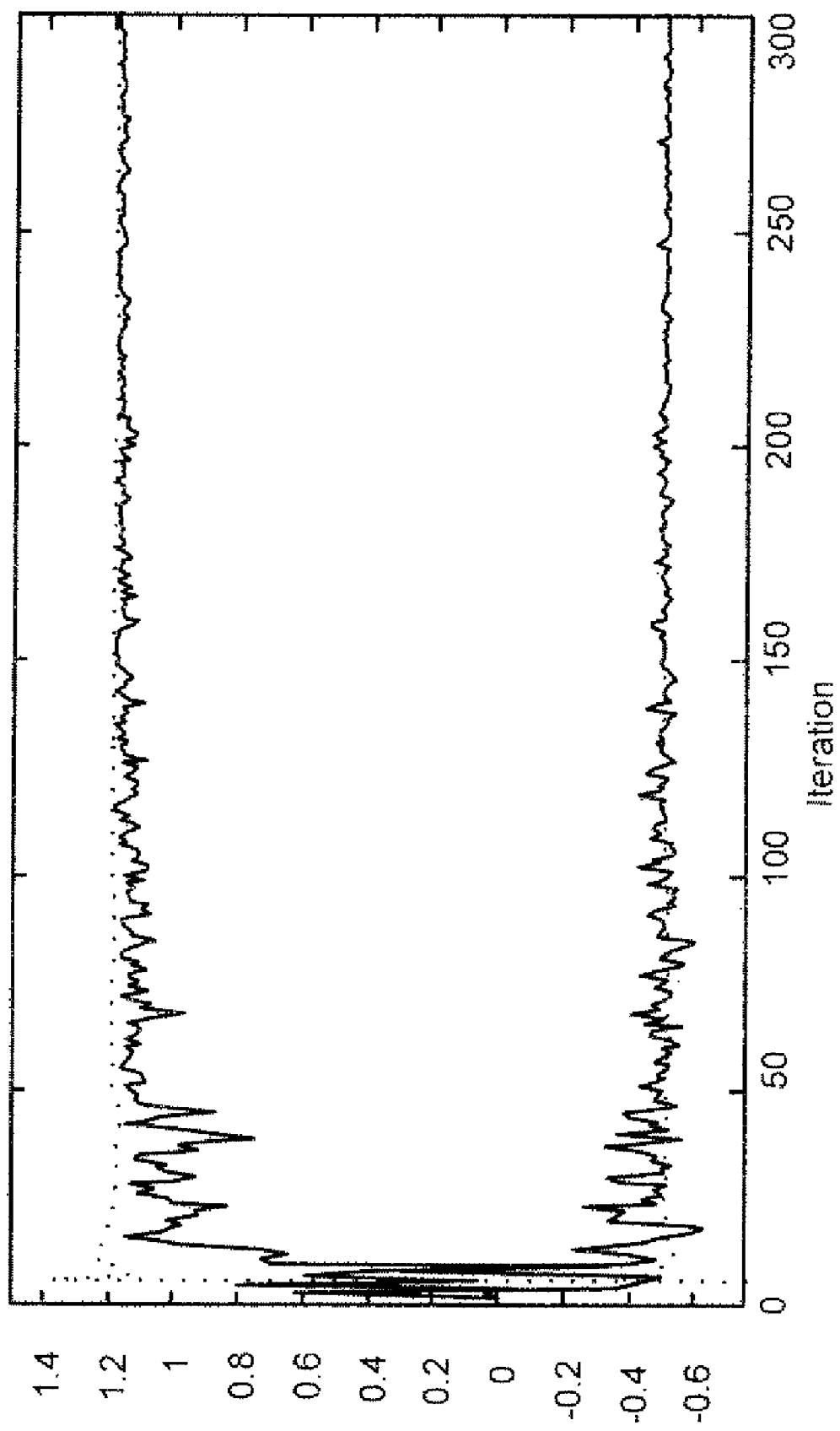
Figure 11:
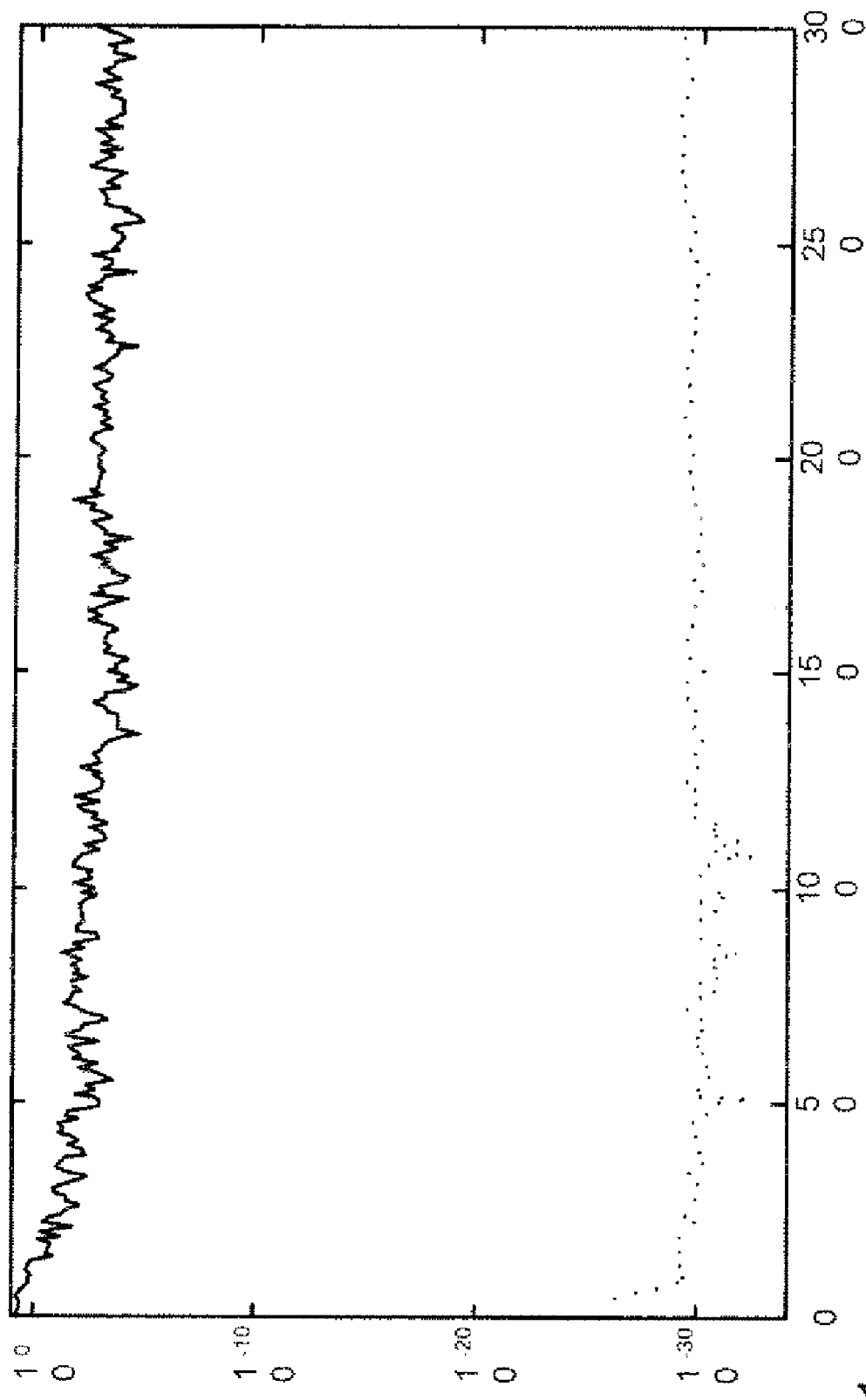
Figure 12:
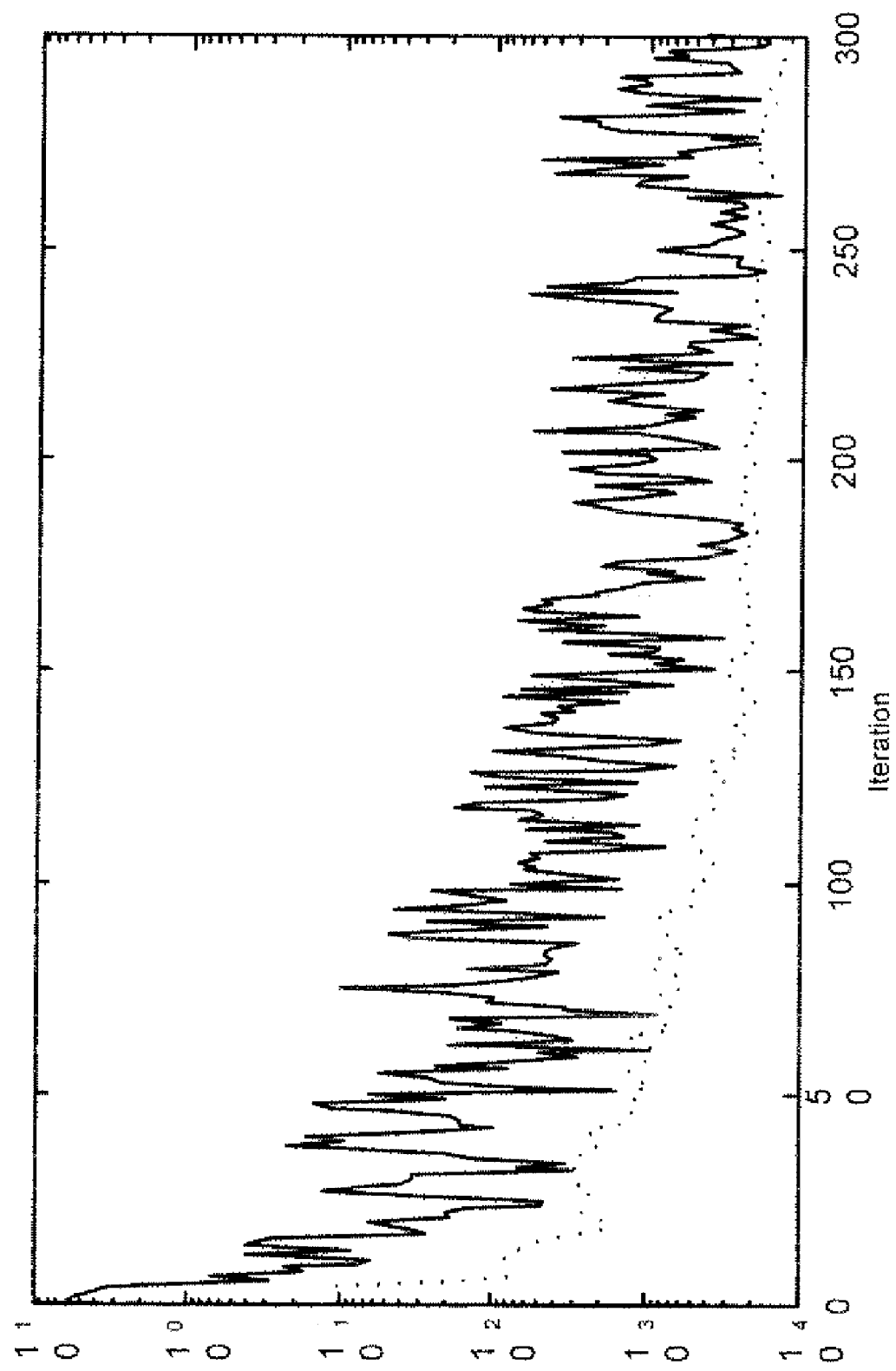

FIG. 9 depicts, for the instance of a noiseless environment, two of the filter coefficients versus time. The dashed horizontal lines are for the Iterative Least Squares solution while the solid jagged lines for the conventional numerical correlation estimate method. In the noiseless case simulated, the Iterative Least Squares solution is correct after 5 time steps (the FIR filter length) while the solution based on the numerically calculated correlations takes more iterations to converge, FIG. 11 depicts the sum squared error between the actual and estimated weight vector at each time step for the noiseless case. In FIG. 11, the solid line represents the conventional correlation estimates and the dashed or lower line is for the Iterative Least Squares solution In one instance the Iterative Least Squares solution conventional numerical correlation estimate solution and are simulated for the case where the observations (filter outputs) are corrupted by uniformly-distributed random noise with an amplitude of 10% of the primary excitation signal. Results of the simulation for two of the filter coefficients versus time are shown in FIG. 10. FIG. 12 depicts the above described error signals for the instance where 10% white measurement noise is present.

In another illustrative embodiment, a controller was designed by assuming a second-order compensator and solving for the closed-loop transfer function. The denominator of the closed-loop transfer function was then equated to the desired transfer function. (The polynomial equation obtained by equating the desired transfer function to the denominator of the closed-loop transfer function is known as the Diophantine equation. See for example, Kelly, A., Rinne, K, *Control of dc-dc converters by direct pole placement and adaptive feedforward gain adjustment*, Twentieth Annual IEEE Applied Power Electronics Conference and Exposition, 2005; APEC 2005, Volume 3, Date: 6-10 Mar. 2005, Pages: 1970-1975, which is incorporated by reference herein.)

Figure 13:
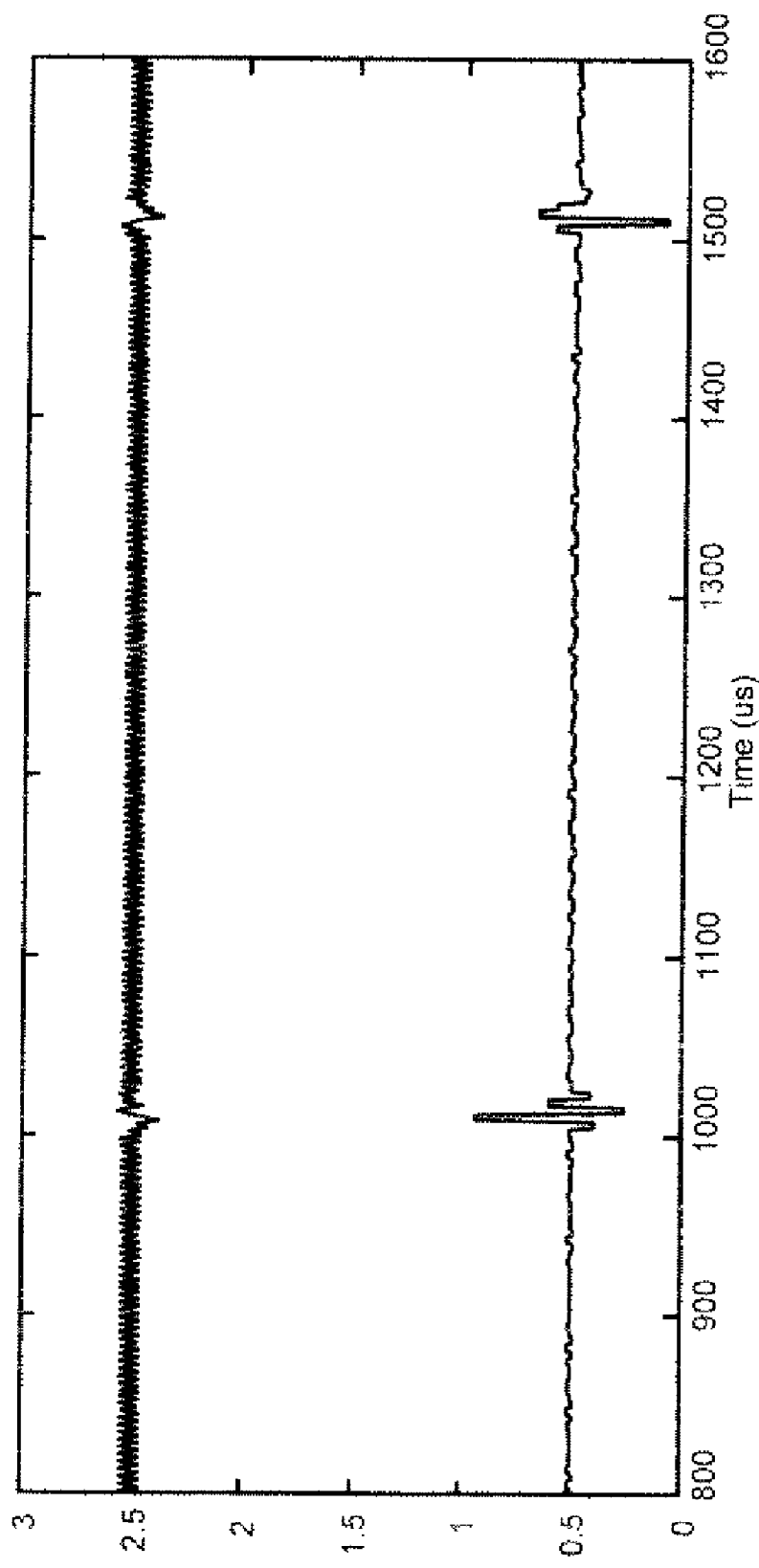
Figure 14:
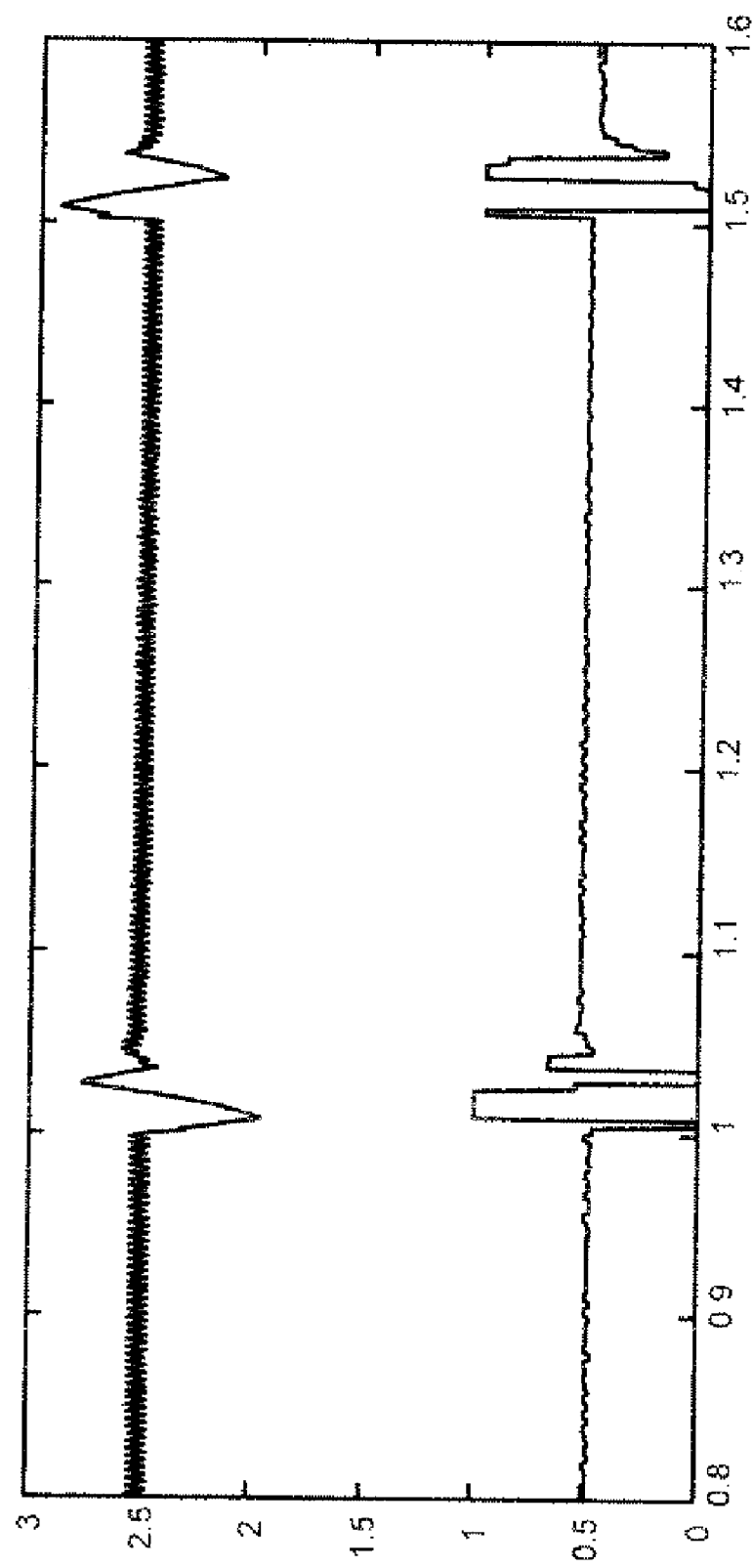

FIG. 13 depicts the transient response of a deadbeat controller, designed utilizing the methods of these teachings, to a step change in load current from 10A to 13A In FIG. 13, the upper trace is output voltage and the lower trace is the commanded duty cycle. FIG. 14 depicts the response of the deadbeat controller, designed utilizing the methods of these teachings, to a large load current step from 5A to 25A where the control signal saturates at full duty cycle. (In FIG. 14, the upper curve reflects output voltage, and the lower curve reflects commanded duty cycle).

As described herein above, the state estimator provides a model of the system to be controlled with an extra input that is used to drive the error between the measurable variables and their corresponding quantities in the model. If the states are observable it is possible to design a gain for this extra input that results in a stable estimator. However, zero error between the estimated states and the real on measurable states is not always obtained, particularly in the presence of unknown disturbances. This is a limitation when applying state space estimation in general and in particular when applying state space estimation for power supplies. Several embodiments of the state estimator used in these teachings are disclosed hereinbelow.

Switching power supplies can be modeled by a set of differential equations with time as the independent variable As an example, the differential equations used to model a buck power supply are as follows:

$$\frac{dx}{dt} = A_e x + B_e u$$

$$y = C_e x + D_e u$$

Where: u is the input vector
x is the state vector
y is the output vector
$A_e$, $B_e$, $C_e$, $D_e$ are gain matrices Assuming that PWM (while in one stationary mode) is modeled as a constant gain equal to the supply voltage, the state vector is the capacitor voltage and conductor current, the input is the duty cycle command, and the output is the output voltage, than the gain matrices are as follows;

$$\frac{d}{dt}\begin{bmatrix}v\\i\end{bmatrix} = \begin{bmatrix}0 & \frac{1}{C}\\ \frac{-1}{L} & -\frac{Rc+Rl}{L}\end{bmatrix}\begin{bmatrix}v\\i\end{bmatrix} + \begin{bmatrix}0 & \frac{Vdd}{L}\end{bmatrix}[duty]$$

$$[vout] = \begin{bmatrix}1 & Rc\end{bmatrix}\begin{bmatrix}v\\i\end{bmatrix} + [0][duty]$$

Where; v is the capacitor voltage
i is the inductor current
Vdd is the supply voltage
duty is the PWM duty cycle
L is the inductor inductance
C is the capacitor capacitance
Rc is the parasitic resistance of the capacitor
RI is the parasitic resistance of the inductor.

The Ae, Be, Ce, and De gain matrices can be readily identified from the equations above. The additional input for state estimation is the error between them measured values and their modeled values this error is multiplied by the gain L. and added to the state vector. In this embodiment, the first equation is modified as:

$$\frac{dx_{est}}{dt} = A_e x_{est} + B_e u + L_e(y - y_{est})$$

$$y_{est} = C_e x_{est} + D_e u$$

Where: $X_{est}$ is the estimated states
yest is the estimate output
Le is the estimator gain matrix
Le can be calculator by conventional techniques.

Figure 15:
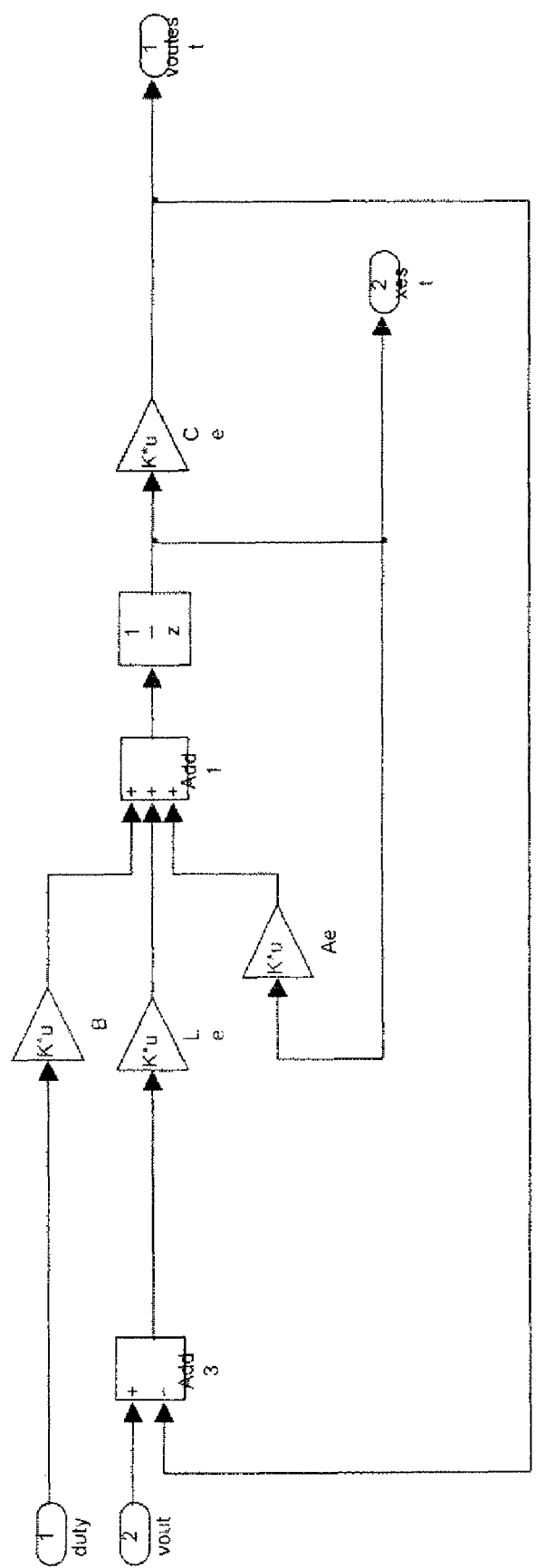
FIG. 15 is a graphical schematic presentation of a state space estimator where, in the most general formulation, the signals are vectors and the gains are matrices.
Figure 16:
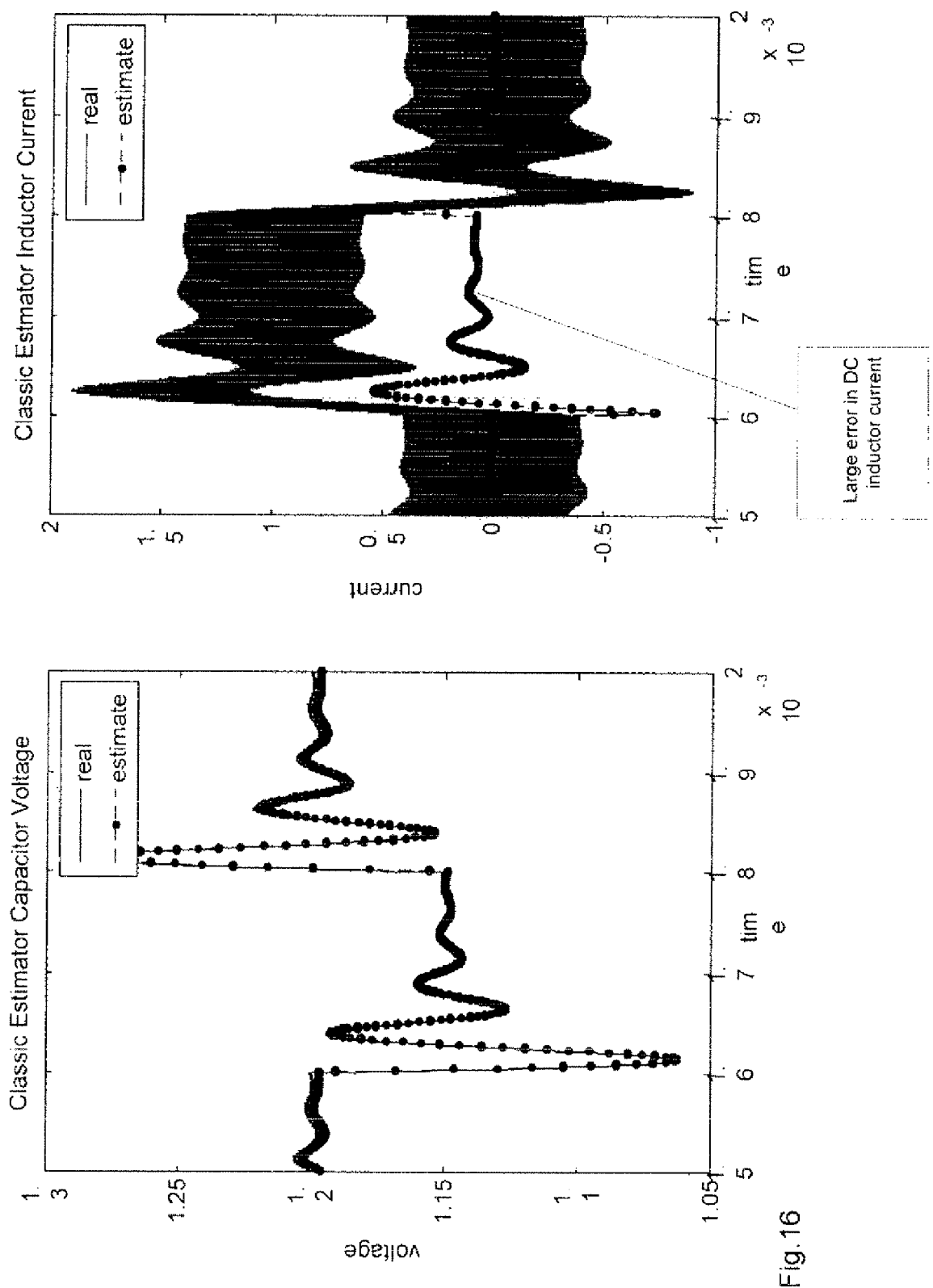
FIG. 16 is a graphical representations of results showing the response of the state estimator for a Switching power supply where the state variables are capacitor voltage and inductor current.

FIG. 15 is a graphical schematic presentation of a state space estimator. The results of a exemplary simulation using the buck converter equations can be seen in FIG. 16, It can be seen that there is a DC error in the inductor current. Also, the load current is not determined.

Figure 17A:
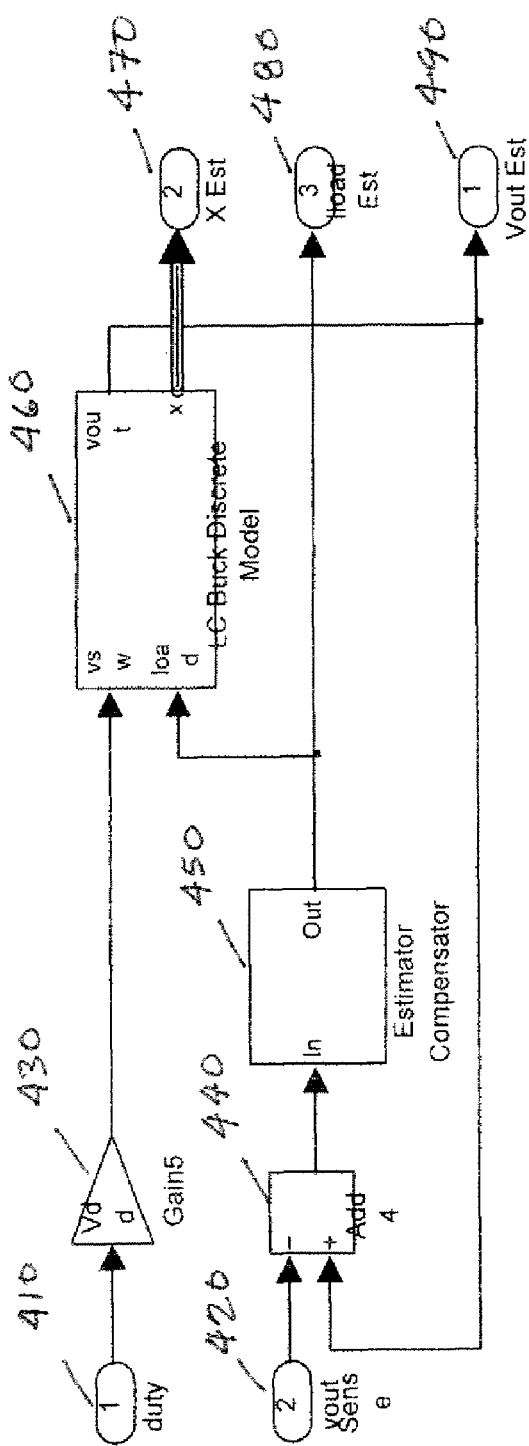
FIG. 17a is a graphical schematic representation of another estimator structure embodiment of these teachings.

Another embodiment of the estimator of these teachings uses a different structure for the state space estimator where instead of using duty cycle as input, it attributes the error between the modeled output voltage and the measured output voltage primarily to an unknown load current. Using load current instead of the duty cycle input as input, the DC error is significantly reduced. Also, proportional integral control is used to drive the average DC error between the output voltage and the modeled output voltage. FIG. 17a is a graphical schematic representation of another estimator structure embodiment of these teachings, Referring to FIG. 17a, there are two inputs duty cycle 410 and output voltage 420. The PWM or pulse with modulator is modeled as a constant gain 430 and its output is driven into a model of the switching power supply 460. The difference between the estimated output voltage and the measured output voltage, the output of substractor 440, is used to drive a compensator 450, which in the embodiment shown, is a pro-portional integral compensator. The compensator output is an estimate 480 of the load current disturbance and is fed into the load current input of the switching power supply model 460. The feedback action insures that the required estimated load disturbance is generated by the compensator. The switching power supply model 460 also provides an estimate of the state 470 and an estimate of the output voltage 490.

Figure 17B:
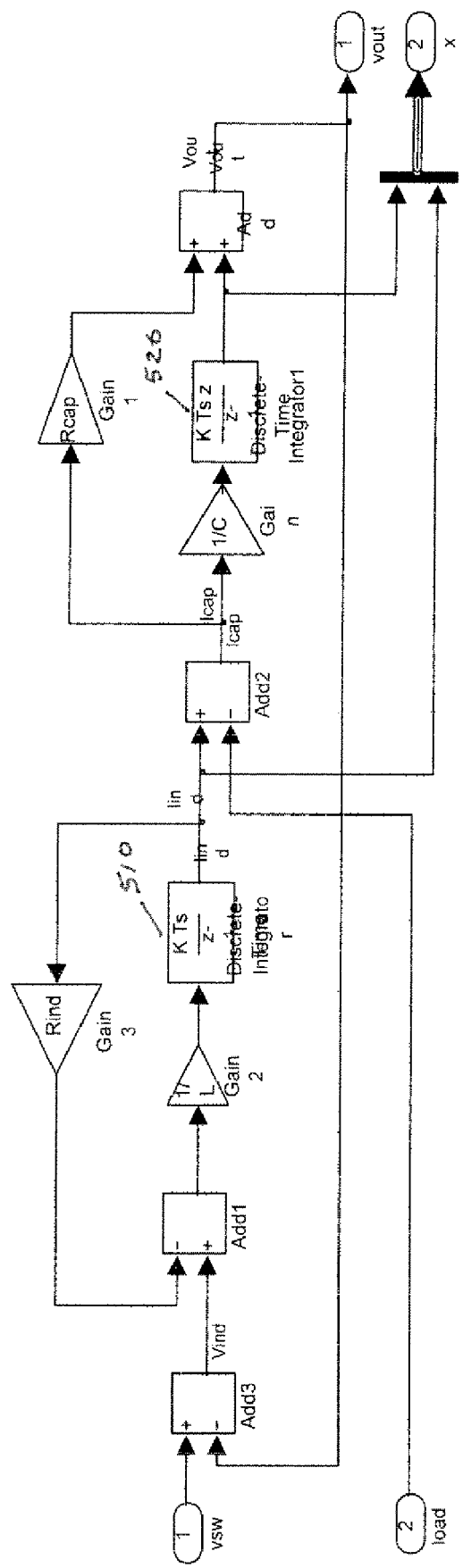
FIG. 17b is a graphical schematic representation of the another estimator structure embodiment of these teachings applied to of a buck regulator.

FIG. 17b shows the discrete time model of a typical buck converter, one instance of the switching power supply model 460. The first integrator 510 is used to model the inductor current and the second integrator 520 is used to model the capacitor voltage. The inductor current and load current are summed to generate the capacitor current. Note that the sign of the inductor current is chosen to match that of a typical load. That means an increase in inductor current causes a reduction in the output voltage. The loops containing Rind and Rcap model the losses and output voltage effects of the parasitic resistances.

Figure 18:
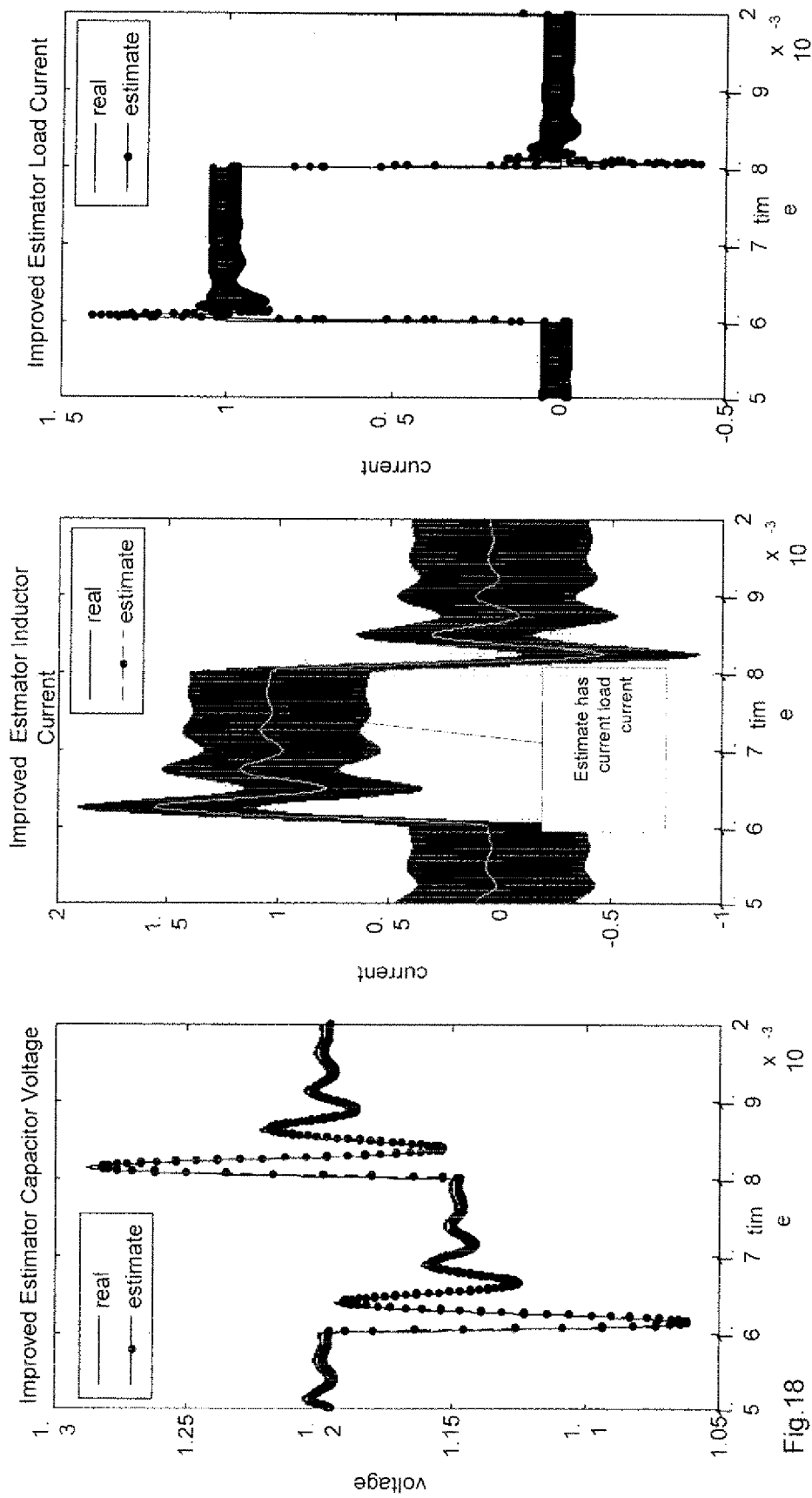
FIG. 18 is a graphical representations of results obtained using the embodiment of FIG. 17b.

FIG. 18 is a graphical representations of results obtained, in an exemplary instance, using the embodiment of FIGS. 17a, 17b. Note that the output voltage is nearly accurately estimated, the inductor current substantially contains the expected DC information and the load current is estimated.

Figure 19:
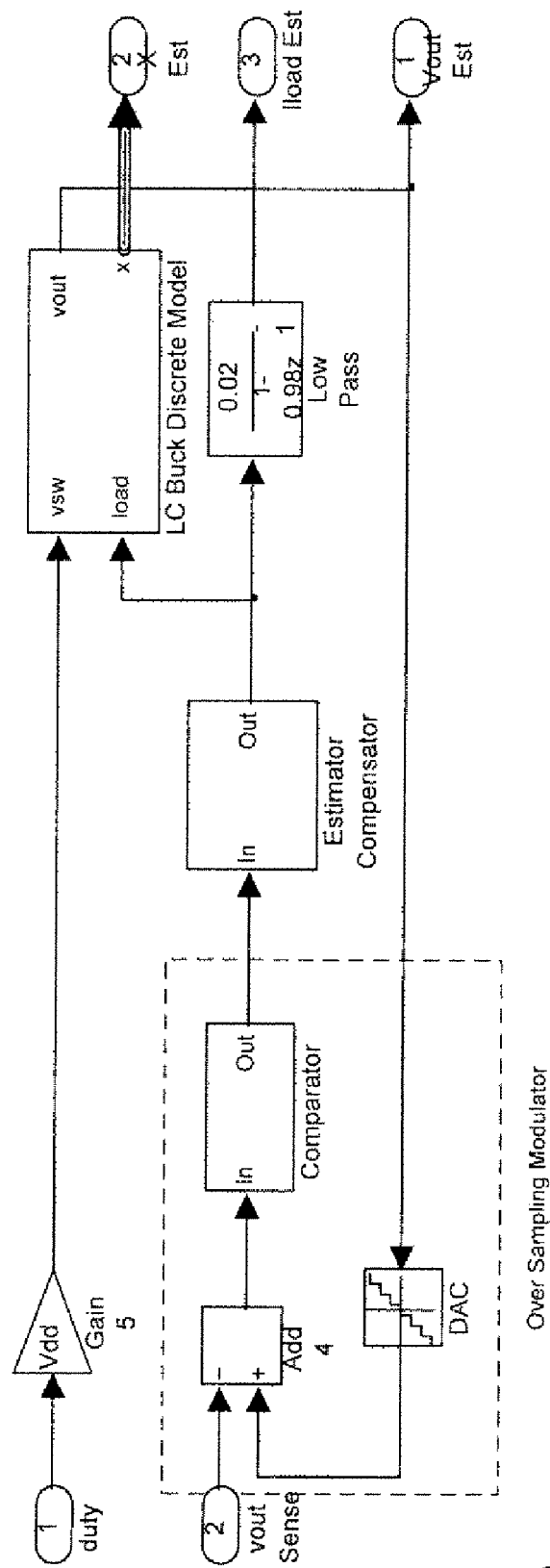
FIG. 19 is a graphical schematic representation of yet another estimator structure embodiment of these teachings.

FIG. 19 shows an additional embodiment, in which the duty cycle is taken as arising from a digital compensator and the discrete time converter model, low-pass filter and estimator compensator are implemented digitally. In this embodiment, the digital sampling rate is chosen to be a multiple of the PWM rate. The combination of that comparator and low-resolution DAC provides a noisy over sampled version of the estimation error. Analog components are the comparator and DAC. As an alternative, a sigma delta modulator or other over-sampling modulator could be used. In this approach, the low-pass filter is the plant model and no additional large filtering delays are incurred. FIG. 19 is an exemplary embodiment of an over-sampling state estimators that use sigma delta or other over-sampling modulator, such as the comparator and DAC, in the error feedback path. Such an embodiment has application to control systems other than control of switching power supplies and can result in a smaller delay than other embodiments.

Figure 20:
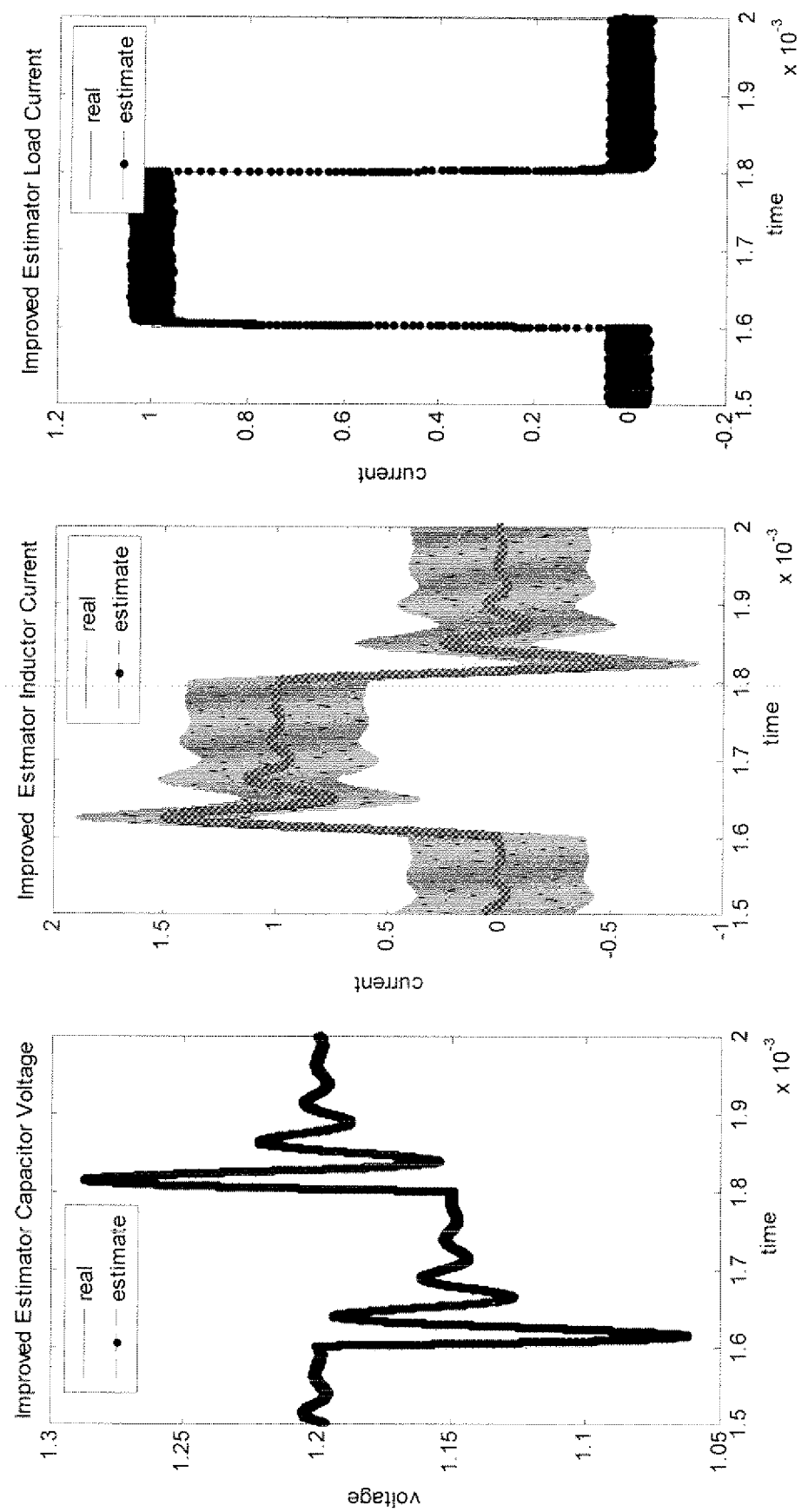
FIG. 20 is a graphical representations of results obtained using the embodiment of FIG. 19.

FIG. 20 is a graphical representations of results obtained for an exemplary instance, using the embodiment of FIG. 19.

It should be noted that, although the above description of the teachings utilized buck converters as an exemplary embodiment, these teachings are not limited to that embodiment, Also, although the above description of the teachings utilized sigma delta modulator as an exemplary embodiment of over-sampling modulators, other over-sampling modulators are within the scope of this invention. (See, for example, but not limited to, the over-sampling modulators disclosed in U.S. Application Publication No. 2007/182610, corresponding to U.S. patent application Ser. No. 11/550,893, entitled Systems and Methods for Digital Control, both of which are incorporated by reference herein.)

Although the present teachings have been described with respect to various embodiments, it should be realized these teachings are also capable of a wide variety of further and other embodiments within the spirit of the present teachings.

What is claimed is:
1. A digital controller comprising:
a sampling component that samples an output signal from a system and an input signal to said system at a first sampling rate, wherein said first sampling rate is at least equal to a predetermined operating rate, and that generates samples;

an input parameter obtaining component that receives said samples and that obtains values for a plurality of input parameters from said samples, wherein said values for said plurality of input parameters are sampled at said first sampling rate;

a decimator component that receives said values for said plurality of input parameters and that generates subsampled values for said plurality of input parameters, wherein said subsampled values are sampled at a second sampling rate that is slower than said first sampling rate;

an adaptive plant estimator component that receives said subsampled values of said plurality of input parameters and that generates a model of said system based on said subsampled values, wherein said model reflects variations in said system;

a compensator design component that receives said model of said system and that determines compensator parameters based on said model, wherein said compensator parameters reflect changes in said system, and wherein values of said compensator parameters are sampled at said second sampling rate; and a feedback compensator that receives said values of said compensator parameters and that adjusts said input signal to said system based on said compensator parameters.

2. The digital controller of claim 1 wherein said sampling component includes an analog to digital converter (ADC) for sampling said output signal and said input signal at said first sampling rate, wherein said first sampling rate is at least equal to said predetermined operating rate of said system.

3. The digital controller of claim 1 wherein said input parameter obtaining component includes an autocorrelation and crosscorrelation estimator.

4. The digital controller of claim 1 wherein said input parameter obtaining component provides a predetermined number of rows and columns from an inverse matrix and a row vector in a least-squares solution.

5. The digital controller of claim 4 further comprising:

a load current estimating component that receives said output signal sampled at said first sampling rate and state estimation data from said adaptive plant estimator and that provides estimated load current data at said first sampling rate; and another decimator component that receives said estimated load current data at said first sampling rate and that provides said estimated load current data at said predetermined operating rate to said feedback compensator.

6. The digital controller of claim 1 wherein said decimator component is integrated with said input parameter obtaining component.

7. The digital controller of claim 1 further comprising:

a load current estimating component that receives said output signal sampled at said first sampling rate and state estimation data from said adaptive plant estimator component and that provides estimated load current data at said first sampling rate; and another decimator component that receives said estimated load current data at said first sampling rate and that provides said estimated load current data at said predetermined operating rate to said feedback compensator.

8. The digital controller of claim 7 wherein said another decimator component is integrated with said feedback compensator.

9. The digital controller of claim 1 wherein said sampling component includes an oversampling modulator, and wherein said first sampling rate is an oversampled rate.

10. The digital controller of claim 9 wherein said oversampling modulator is a sigma delta modulator.

11. The digital controller of claim 1 wherein said first sampling rate is substantially equal to twice said predetermined operating rate.

12. The digital controller of claim 11 wherein said system includes a switching power supply and said predetermined operating rate is a pulse width modulation (PWM) rate.

13. The digital controller of claim 1 wherein said compensator design component utilizes pole and zero placement.

14. The digital controller of claim 1 further comprising a disturbance injection component that injects noise into said input signal, wherein said noise is used to detect changes in said system.

15. The digital controller of claim 1 wherein said adaptive plant estimator component generates said model using at least one of a least mean squares (LMS) algorithm and a recursive least squares (RLS) algorithm.

16. The digital controller of claim 1 wherein said compensator design component generates said compensator parameters using a microsequencer.

17. A method for digital control of a system, the method comprising:

sampling an output signal from said system and an input signal to said system at a first sampling rate and generating samples, wherein said first sampling rate is at least equal to a predetermined operating rate;

obtaining, from said samples, values for a plurality of input parameters, wherein said values for said plurality of input parameters are sampled at said first sampling rate;

decimating said values for said plurality of input parameters in order to obtain values for a plurality of subsampled input parameters, wherein said plurality of subsampled input parameters are sampled at a second sampling rate, wherein said second sampling rate is slower than said first sampling rate;

generating, from said plurality of subsampled input parameters, a model for said system;

obtaining, from said model for said system, compensator parameters, wherein said compensator parameters reflect changes in said system, and wherein values of said compensator parameters are sampled at said second sampling rate;

providing said compensator parameters to an adaptive feedback compensator; and adjusting said input signal to said system based on said compensator parameters.

18. The method of claim 17 wherein obtaining values for said plurality of input parameters comprises obtaining estimates for an autocorrelation and a crosscorrelation.

19. The method of claim 17 wherein obtaining values for said plurality of input parameters comprises obtaining values for a predetermined finite number of rows and columns from an inverse matrix and a row vector in a least-squares solution.

20. The method of claim 17 wherein obtaining compensator parameters comprises opening compensator parameters by pole and zero placement.

* * * * *

UNITED STATES PATENT AND TRADEMARK OFFICE
CERTIFICATE OF CORRECTION

| | |
|---|---|
| PATENT NO. | : 8,014,879 B2 |
| APPLICATION NO. | : 11/553917 |
| DATED | : September 6, 2011 |
| INVENTOR(S) | : Paul Latham and John C. Canfield |

It is certified that error appears in the above-identified patent and that said Letters Patent is hereby corrected as shown below:

Col. 1, Line 27, delete "it" after "has".
Col. 1, Line 54, delete "supply," and insert --supply.--.
Col. 2, Line 22, delete "input signals" and insert --input signal--.
Col. 2, Line 33, delete "been" and insert --being--.
Col. 2, Line 39, after first occurrence of "parameters" insert --,--.
Col. 3, Line 1, delete "vet" and insert --yet--.
Col. 3, Line 10, delete "representations" and insert --representation--.
Col. 3, Line 16, after "of" delete "the".
Col. 3, Line 18, after "to" delete "of".
Col. 3, Line 19, delete "representations" and insert --representation--.
Col. 3, Line 24, delete "representations" and insert --representation--.
Col. 3, Line 48, delete "diving" and insert --driving--.
Col. 3, Line 59, delete "power supply 10" and insert --power supply 110--.
Col. 4, Line 11, delete "and" and insert --an--.
Col. 4, Line 18, delete "etc" and insert --etc.--.
Col. 4, Line 22, delete "input signals" and insert --input signal--.
Col. 4, Line 33, delete "been" and insert --being--.
Col. 4, Line 58, delete "been" and insert --being--.
Col. 4, Line 65, after "system" insert --,--.
Col. 5, Line 14, delete "power supply 210," and insert --power supply 210.--.
Col. 5, Line 43, delete "aDelta" and insert --a Delta--.
Col. 5, Line 44, after "including" delete "a".
Col. 5, Line 53, delete "a oversampling" and insert --an oversampling--.
Col. 6, Line 9, delete "modulator)" and insert --modulator).--.
Col. 6, Line 44, delete "been" and insert --being--.
Col. 6, Line 63, delete "hereinabove" and insert --hereinabove.--.
Col. 7, Line 3, delete "systems," and insert --systems.--.
Col. 7, Line 11, delete "time short" and insert --short time--.
Col. 7, Line 27, delete "ad" and insert --and--.

Signed and Sealed this
Second Day of October, 2012

David J. Kappos
*Director of the United States Patent and Trademark Office*

CERTIFICATE OF CORRECTION (continued)
U.S. Pat. No. 8,014,879 B2

Col. 8, Line 50, delete "Implemented" and insert --implemented--.
Col. 9, Line 32, delete "matrix," and insert --matrix.--.
Col. 9, Line 64, delete "environment.," and insert --environment.--.
Col. 10, Line 8, delete "converge," and insert --converge.--.
Col. 10, Line 13, after "solution" insert --.--.
Col. 10, Line 37, after "13A" insert --.--.
Col. 10, Line 59, after "variable" insert --.--.
Col. 11, Line 9, delete "than" and insert --then--.
Col. 11, Line 9, delete "follows;" and insert --follows:--.
Col. 11, Line 20, delete "Where;" and insert --Where:--.
Col. 11, Line 28, delete "Ae, Be, Ce, and De" and insert --$A_e$, $B_e$, $C_e$, and $D_e$--.
Col. 11, Line 30, delete "them" and insert --the--.
Col. 11, Line 31, delete "values this" and insert --values. This--.
Col. 11, Line 31, delete "L." and insert --L--.
Col. 11, Line 41, delete "$X_{est}$" and insert --$x_{est}$--.
Col. 11, Line 42, delete "yest" and insert --$y_{est}$--.
Col. 11, Line 43, delete "Le" and insert --$L_e$--.
Col. 11, Line 44, delete "Le" and insert --$L_e$--.
Col. 11, Line 44, delete "calculator" and insert --calculated--.
Col. 11, Line 46, delete "a exemplary" and insert --an exemplary--.
Col. 11, Line 47, delete "FIG. 16," and insert --FIG. 16.--.
Col. 11, Line 60, delete "teachings," and insert --teachings.--.
Col. 11, Line 61, delete "inputs" and insert --input--.
Col. 11, Line 62, delete "with" and insert --width--.
Col. 12, Line 19, delete "representations" and insert --representation--.
Col. 12, Line 36, delete "estimators" and insert --estimator--.
Col. 12, Line 37, delete "modulator" and insert --modulators--.
Col. 12, Line 42, delete "representations" and insert --representation--.
Col. 12, Lines 46-47, delete "embodiment," and insert --embodiment.--.